US012637552B2

(12) United States Patent
Shimada et al.

(10) Patent No.: US 12,637,552 B2
(45) Date of Patent: May 26, 2026

(54) COMMUNICATION CABLE, WIRE HARNESS, AND METHOD FOR MANUFACTURING COMMUNICATION CABLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tatsuya Shimada, Mie (JP); Yuta Yasuyoshi, Mie (JP); Katsushi Sakamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 195 days.

(21) Appl. No.: 18/280,624

(22) PCT Filed: Feb. 22, 2022

(86) PCT No.: PCT/JP2022/007149
§ 371 (c)(1),
(2) Date: Sep. 6, 2023

(87) PCT Pub. No.: WO2022/190850
PCT Pub. Date: Sep. 15, 2022

(65) Prior Publication Data
US 2024/0150554 A1     May 9, 2024

(30) Foreign Application Priority Data

Mar. 8, 2021     (JP) ................................. 2021-036056

(51) Int. Cl.
*C08K 13/02* (2006.01)
*C08K 5/3417* (2006.01)
(Continued)

(52) U.S. Cl.
CPC ............ *C08K 13/02* (2013.01); *C08K 5/3417* (2013.01); *C08L 23/12* (2013.01); *H01B 3/441* (2013.01);
(Continued)

(58) Field of Classification Search
CPC . B60R 16/0207; B60R 16/0215; H01B 7/295; H01B 7/29
See application file for complete search history.

(56) References Cited

U.S. PATENT DOCUMENTS

2012/0289753 A1* 11/2012 Luengo Marin ......... C10G 3/40
423/449.1
2012/0318556 A1* 12/2012 Kogo ..................... H01B 3/442
174/110 SR
(Continued)

FOREIGN PATENT DOCUMENTS

JP        2012-102303 A      5/2012
JP        2014157783 A   *  8/2014   ............. H01B 17/56

OTHER PUBLICATIONS

International Search Report issued on Apr. 19, 2022 for WO 2022/190850 A1 (4 pages).

*Primary Examiner* — Paresh Paghadal
(74) *Attorney, Agent, or Firm* — Venjuris, P.C.

(57) ABSTRACT

Provided are a communication cable that includes a resin composition formed by adding a halogenated flame retardant and a flame retardant auxiliary to an olefin-based polymer and is excellent in stability of the communication properties and heat resistance, a wire harness that includes such a communication cable, and a manufacturing method accord- (Continued)

ing to which such a communication cable can be manufactured with high productivity. A communication cable 1 includes a signal wire 10 constituted by a pair of insulated wires 11 each having a conductor 12 and an insulating coating 13 covering the outer circumference of the conductor 12, and an insulating external layer 20 covering the outer circumference of the signal wire 10. The characteristic impedance is within a range of $100 \pm 10\Omega$.

17 Claims, 2 Drawing Sheets

(51) Int. Cl.

| | | |
|---|---|---|
| *C08L 23/12* | (2006.01) | |
| *H01B 3/44* | (2006.01) | |
| *H01B 7/295* | (2006.01) | |
| *H01B 11/02* | (2006.01) | |
| *H01B 13/06* | (2006.01) | |
| *C08K 3/22* | (2006.01) | |
| *C08K 5/03* | (2006.01) | |

(52) U.S. Cl.
CPC ............ *H01B 7/295* (2013.01); *H01B 11/02* (2013.01); *H01B 13/06* (2013.01); *C08K 2003/2224* (2013.01); *C08K 3/2279* (2013.01); *C08K 5/03* (2013.01); *C08K 2201/005* (2013.01); *C08K 2201/014* (2013.01); *C08L 2201/02* (2013.01); *C08L 2201/08* (2013.01); *C08L 2203/202* (2013.01); *C08L 2310/00* (2013.01)

(56) References Cited

U.S. PATENT DOCUMENTS

| | | | |
|---|---|---|---|
| 2013/0008691 A1 | 1/2013 | Shimada et al. | |
| 2015/0144375 A1* | 5/2015 | Hashimoto ............ | H01B 1/026 |
| | | | 174/113 R |
| 2018/0114610 A1 | 4/2018 | Uegaki et al. | |
| 2018/0286537 A1* | 10/2018 | Horiuchi ................. | H01B 7/00 |
| 2019/0027272 A1 | 1/2019 | Uegaki et al. | |
| 2019/0286537 A1* | 9/2019 | Bhuyan ................... | G06F 11/26 |
| 2019/0355492 A1 | 11/2019 | Uegaki et al. | |
| 2020/0118708 A1 | 4/2020 | Uegaki et al. | |
| 2020/0251249 A1 | 8/2020 | Uegaki et al. | |
| 2020/0299493 A1* | 9/2020 | Taki ................... | C08L 23/0869 |
| 2021/0005348 A1 | 1/2021 | Uegaki et al. | |
| 2021/0065926 A1* | 3/2021 | Kogo ..................... | H01B 3/443 |
| 2022/0081541 A1* | 3/2022 | Kogo ..................... | C08L 23/04 |

* cited by examiner

1

COMMUNICATION CABLE, WIRE HARNESS, AND METHOD FOR MANUFACTURING COMMUNICATION CABLE

CROSS REFERENCE TO RELATED APPLICATIONS

This application is a national phase of PCT application No. PCT/JP2022/007149, filed on 22 Feb. 2022, which claims priority from Japanese patent application No. 2021-036056, filed on 8 Mar. 2021, all of which are incorporated herein by reference.

TECHNICAL FIELD

The present disclosure relates to a communication cable, a wire harness, and a method for manufacturing a communication cable.

BACKGROUND

There is increasing demand for high-speed communication in the automotive field and the like. Communication-related properties (e.g., a characteristic impedance) of cables for high-speed communication need to be tightly controlled. For example, the properties of communication cables for automotive Ethernet communication that include, as a signal wire, a twisted pair wire formed by twisting a pair of insulated wires together need to be controlled to be within predetermined ranges (e.g., a range of $100 \pm 10\Omega$ for a characteristic impedance).

The communication-related properties (e.g., a characteristic impedance) of communication cables that include a signal wire constituted by a pair of insulated wires can be adjusted by adjusting the component compositions and material characteristics of resin compositions included in insulating coatings of the insulated wires and an insulating external layer (sheath) covering the outer circumference of the signal wire. For example, Patent Document 1, which was filed by the present applicants, discloses an aspect of a communication cable that includes: a twisted pair wire formed by twisting a pair of insulated wires that each include a conductor and an insulating coating covering the outer circumference of the conductor; and a sheath that is made of an insulation material and covers the outer circumference of the twisted pair wire, wherein the sheath has a dielectric dissipation factor of 0.0001 or more. Patent Document 1 states that the dielectric dissipation factor of the constituent materials of the entire sheath is adjusted by adding a polar additive that increases the dielectric dissipation factor, such as magnesium hydroxide serving as a flame retardant, to a non-polar or low-polarity polymer material, such as a polyolefin.

In Patent Document 1, magnesium hydroxide is mainly used as a flame retardant added to the insulating external layer and the insulating coating. However, other examples of a flame retardant added to a non-flame-retardant resin such as polyolefin used in an automobile communication cable include halogen-based organic compounds, phosphorus-containing compounds, and nitrogen-containing compounds. It is preferable that the content of the flame retardant in the communication cable is as low as possible from the viewpoint of reducing an influence of the addition of the flame retardant on the communication properties and the viewpoint of reducing changes in the communication properties and the material properties in a high-temperature environment and improving the heat resistance of the communication cable. Out of the flame retardants listed above, the flame retardant composed of a halogen-based organic compound (halogenated flame retardant) exhibits a flame-retardant effect even in a small amount, and it can thus be said that it is preferable to add the halogen-based flame retardant to the insulating external layer and the insulating coating of the communication cable.

PRIOR ART DOCUMENT

Patent Document

Patent Document 1: WO 2018/117204 A1
Patent Document 2: WO 2017/168842 A1

SUMMARY OF THE INVENTION

Problems to be Solved

As described above, the halogenated flame retardant can be preferably used as a flame retardant added to an olefin-based polymer in the insulating coating and the insulating external layer included in the communication cable. The halogenated flame retardant gasifies during combustion and thereby suppresses combustion of a polymer component, and thus exhibits the flame-retardant effect. In order to enable this effect to be sufficiently exhibited, it is common to add a flame retardant auxiliary composed of antimony trioxide and the like together with the halogenated flame retardant. However, a flame retardant auxiliary containing antimony trioxide is prone to secondary aggregation.

Formed aggregates of the flame retardant auxiliary become factors that cause spatial ununiformity of the material properties including dielectric properties such as a dielectric constant and a dielectric dissipation factor in the communication cable, which leads to ununiformity and instability of the communication properties. Moreover, although the communication cable is required to maintain high communication properties even when used in a harsh environment such as a high-temperature environment for a long period of time, the formation of aggregates of the flame retardant auxiliary tends to change the material properties of the resin composition and the communication properties of the communication cable, in a high-temperature environment. Furthermore, the formation of coarse aggregates also leads to a decrease in the productivity of the communication cable. In particular, the insulating coating included in the signal wire is often formed as a thin coating in order to reduce the diameter and secure communication properties, and therefore, the influence of the formation of aggregates of the flame retardant auxiliary tends to be prominent. As described above, the communication cable tends to be greatly affected by aggregation of the flame retardant auxiliary compared with a non-communication cable such as a power transmission cable. Accordingly, if the composition of components that has been applied to a resin composition containing a halogenated flame retardant and a flame retardant auxiliary in conventional common non-communication cables is applied to a communication cable as it is, there is a risk that the properties required of the communication cables cannot be satisfied.

Therefore, it is an object of the present invention to provide a communication cable that includes a resin composition formed by adding a halogenated flame retardant and a flame retardant auxiliary to an olefin-based polymer and is excellent in stability of the communication properties and heat resistance, a wire harness that includes such a communication cable, and a manufacturing method according to which such a communication cable can be manufactured with high productivity.

Means to Solve the Problem

A communication cable according to the present disclosure includes: a signal wire constituted by a pair of insulated wires each having a conductor and an insulating coating covering an outer circumference of the conductor; and an insulating external layer covering an outer circumference of the signal wire, wherein a characteristic impedance is within a range of $100\pm10\Omega$, at least one of the insulating coating and the insulating external layer is made of a flame-retardant resin composition that contains: at least one selected from a polyolefin and an olefin-based copolymer; a flame retardant containing a brominated flame retardant; and a flame retardant auxiliary containing antimony trioxide, and an aggregate containing the flame retardant auxiliary has an aggregation diameter of 50 μm or less.

A wire harness of the present disclosure includes the communication cable described above.

A method for manufacturing a communication cable according to the present disclosure includes a step of preparing the flame-retardant resin composition, the step including: preparing a flame retardant auxiliary masterbatch in which a concentration of the flame retardant auxiliary in a polymer component is higher than that in a final product of the flame-retardant resin composition and that does not contain the flame retardant; and mixing the flame retardant auxiliary masterbatch with another component, wherein the communication cable described above is manufactured.

Effect of the Invention

The communication cable of the present disclosure is a communication cable that includes a resin composition formed by adding a halogenated flame retardant and a flame retardant auxiliary to an olefin-based polymer and is excellent in stability of the communication properties and heat resistance, and the wire harness of the present disclosure is a wire harness that includes such a communication cable. In addition, with the method for manufacturing a communication cable according to the present disclosure, it is possible to manufacture such a communication cable with high productivity.

BRIEF DESCRIPTION OF THE DRAWINGS

FIG. 3A illustrates a case where a flame retardant auxiliary in the form of a powder was added and kneading was performed once. FIG. 3B illustrates a case where a flame retardant auxiliary in the form of a powder was added and kneading was performed twice. FIG. 3C illustrates a case where a masterbatch containing a flame retardant auxiliary was added.

DETAILED DESCRIPTION TO EXECUTE THE INVENTION

Figure 1:
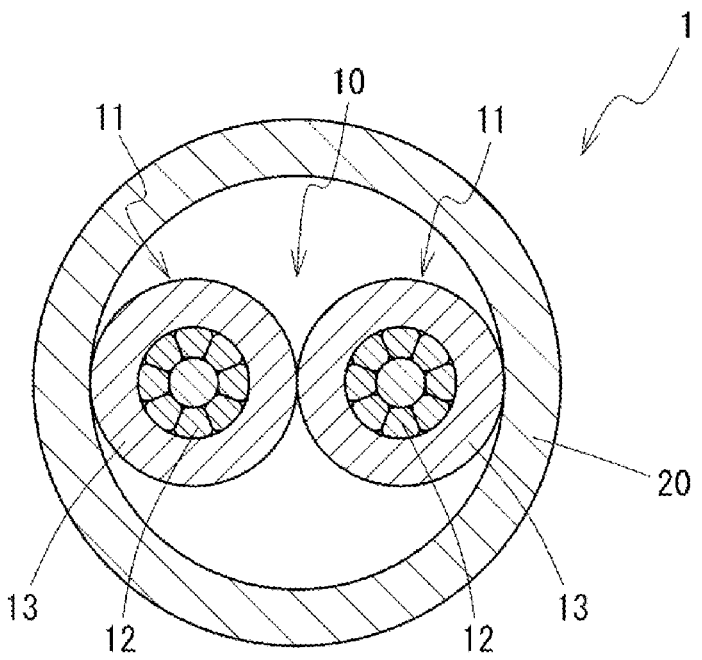
FIG. 1 is a cross-sectional view showing a communication cable with an insulating external layer having a hollow structure as a communication cable according to an embodiment of the present disclosure.

Description of Embodiments of the Present Disclosure

First, aspects of the present disclosure will be listed and described.

A communication cable according to the present disclosure includes: a signal wire constituted by a pair of insulated wires each having a conductor and an insulating coating covering an outer circumference of the conductor; and an insulating external layer covering an outer circumference of the signal wire, wherein a characteristic impedance is within a range of $100\pm10\Omega$, at least one of the insulating coating and the insulating external layer is made of a flame-retardant resin composition that contains: at least one selected from a polyolefin and an olefin-based copolymer; a flame retardant containing a brominated flame retardant; and a flame retardant auxiliary containing antimony trioxide, and an aggregate containing the flame retardant auxiliary has an aggregation diameter of 50 μm or less.

In the communication cable above, at least one of the insulating coating included in the signal wire and the insulating external layer covering the outer circumference of the signal wire is made of the flame-retardant resin composition formed by adding a brominated flame retardant and a flame retardant auxiliary containing antimony trioxide to an olefin-based polymer. In this flame-retardant resin composition, the aggregation diameter of the aggregate containing the flame retardant auxiliary is limited to 50 μm or less. Due to the aggregation diameter of the aggregate containing the flame retardant auxiliary being limited to a small value, spatial ununiformity of the material properties including dielectric properties is less likely to occur in the flame-retardant resin composition. As a result, communication-related properties such as a characteristic impedance can be stabilized. That is to say, the communication-related properties can be stabilized in a low ununiformity state in every portion of the communication cable. Moreover, the physical properties of the flame-retardant resin composition are less likely to be changed even in a high-temperature environment due to the flame retardant auxiliary being dispersed in the flame-retardant resin composition without forming coarse aggregates. Therefore, even in a high-temperature environment, the material properties in the insulating coating and the insulating external layer and the communication properties of the communication cable are stably maintained, and the communication cable has high heat resistance. Furthermore, due to the flame retardant auxiliary not forming a coarse aggregate, the manufacturing conditions are less likely to vary and high productivity is stably achieved in a step of manufacturing a communication cable that includes performing extrusion molding of the flame-retardant resin composition.

Here, it is preferable that at least the insulating external layer is made of the flame-retardant resin composition. With this configuration, the communication cable tends to have high flame retardancy overall.

It is preferable that the signal wire is a twisted pair wire formed by twisting the pair of insulated wires together. With this configuration, the stability of the communication-related properties such as a characteristic impedance are especially easy to improve.

It is preferable that a noise shielding member made of a metal is not provided between the insulating external layer and the signal wire. With this configuration, the overall configuration of the communication cable is simplified. Moreover, in the case where the insulating coating or the insulating external layer contains coarse aggregates, if the noise shielding member is not provided, the communication properties tend to be greatly affected by the aggregates. However, the aggregation diameters of the aggregates are limited, thus making it possible to reduce the influence on the communication properties.

It is preferable that the flame retardant contained in the flame-retardant resin composition is composed of only the brominated flame retardant, or a metal hydroxide flame retardant in addition to the brominated flame retardant. With this configuration, high flame-retardant effect can be achieved while the amount of the flame retardant added to the flame-retardant resin composition is reduced as a whole. If the addition amount of the flame retardant can be reduced, the stability of the communication properties can be efficiently improved due to the effect caused by this reduction in combination with the effect caused by reducing the aggregation diameters of the aggregates of the flame retardant auxiliary.

It is preferable that at least the insulating external layer is made of the flame-retardant resin composition, and in the flame-retardant resin composition included in the insulating external layer, when a content of a polymer component is taken as 100 parts by mass, a total content of the flame retardant and the flame retardant auxiliary is 30 parts by mass or more. With this configuration, a high flame-retardant effect is achieved in the communication cable. Note that, in the case where a flame retardant other than the brominated flame retardant, such as a metal hydroxide flame retardant, is also contained as the flame retardant, "the content is 30 parts by mass or more" means that the total content of all the flame retardants (i.e., the brominated flame retardant and the flame retardant other than the brominated flame retardant) and the flame retardant auxiliary is 30 parts by mass or more.

It is preferable that, when a content of a polymer component is taken as 100 parts by mass, the flame-retardant resin composition contains the brominated flame retardant in an amount of 20 parts by mass or more and 50 parts by mass or less, and the flame retardant auxiliary in an amount of 5 parts by mass or more and 25 parts by mass or less. With this configuration, the communication cable tends to have high flame retardancy and be excellent in the stability of the communication properties and the heat resistance.

In this case, it is preferable that, when a content of a polymer component is taken as 100 parts by mass, the flame-retardant resin composition further contains a metal hydroxide flame retardant in an amount of 20 parts by mass or more and 100 parts by mass or less as the flame retardant in addition to the brominated flame retardant. The flame retardancy of the flame-retardant resin composition can be further improved by adding the metal hydroxide flame retardant in addition to the brominated flame retardant. Setting the addition amount of the metal hydroxide flame retardant to 100 parts by mass or less also makes it possible to reduce the influence of the addition of a large amount of metal hydroxide flame retardant on the material properties and the communication properties.

It is preferable that the insulating coating is made of a resin composition containing at least one selected from a polyolefin and an olefin-based copolymer and neither the flame retardant nor the flame retardant auxiliary, and the insulating external layer is made of the flame-retardant resin composition. In this case, the insulating external layer is responsible for the flame retardancy of the communication cable. The influences of the flame retardant and the flame retardant auxiliary on the communication properties of the communication cable is reduced by adding neither a flame retardant nor a flame retardant auxiliary to the insulating coating, which directly covers the outside of the conductor included in the signal wirer, and reducing the dielectric constant and the dielectric dissipation factor.

In this case, it is preferable that the insulating external layer has a solid structure. With this configuration, the insulating external layer made of the flame-retardant resin composition surrounds the outer circumference of the insulating coating while occupying a large volume, and therefore, the communication cable can exhibit high flame retardancy overall due to the flame-retardant effect of the insulating external layer even if the insulating coating does not contain the flame retardant.

Alternatively, it is preferable that both the insulating coating and the insulating external layer are made of the flame-retardant resin composition. With this configuration, the communication cable has particularly high flame retardancy overall due to both the insulating coating and the insulating external layer exhibiting the flame-retardant effect.

In this case, it is preferable that the insulating external layer has a hollow structure. When the insulating external layer has a hollow structure, an air layer is formed around the outer circumference of the signal wire, and thus the communication cable exhibits favorable communication properties. Meanwhile, when the insulating external layer has a hollow structure, combustion easily progresses in the space surrounded by the insulating external layer. However, high flame retardancy can be secured throughout the communication cable due to the insulating coating as well as the insulating external layer being made of the flame-retardant resin composition.

It is preferable that contents of the flame retardant and the flame retardant auxiliary in the flame-retardant resin composition included in the insulating coating are the same as those in flame-retardant resin composition included in the insulating external layer, based on a mass of a polymer component. With this configuration, even when the individual thicknesses of the insulating coating and the insulating external layer are slightly ununiform in the communication cable, it is possible to stably maintain the communication properties of the communication cable as long as the total thickness of the insulating coating and the insulating external layer is uniform. Accordingly, there is no need to tightly control the manufacturing tolerances in the formation of the insulating coating and the insulating external layer, thus making it possible to improve the productivity of the communication cable.

When both the insulating coating and the insulating external layer are made of the flame-retardant resin composition, it is preferable that a constituent material of the insulating coating has a higher flexural modulus than a constituent material of the insulating external layer, and a lower relative dielectric constant than the constituent material of the insulating external layer. Even if the insulating external layer has a large thickness for the purpose of improving the signal wire protecting effect and the flame-retardant effect, it is possible to ensure high flexural flexibility throughout the communication cable using constituent materials with a low flexural modulus for the insulating external layer. Meanwhile, due to the constituent materials of the insulating coating having a low relative dielectric constant, the communication cable tends to have high communication properties. Even if the insulating external layer has a high relative dielectric constant due to addition of relatively large amounts of the flame retardant and the flame retardant auxiliary, there is only a little influence on the communication properties since the insulating external layer is disposed at a position far away from the conductors included in the signal wire.

In this case, it is preferable that the constituent material of the insulating coating has a flexural modulus of 800 MPa or more and 2000 MPa or less and a relative dielectric constant of 1.9 or more and less than 2.9, and the constituent material of the insulating external layer has a flexural modulus of 300 MPa or more and 700 MPa or less and a relative dielectric constant of 2.3 or more and less than 3.2. With this configuration, the communication cable tends to be excellent in the communication properties such as mode conversion properties, and the flexural flexibility as a whole.

When both the insulating coating and the insulating external layer are made of the flame-retardant resin composition, it is preferable that the insulating coating further contains a metal deactivator and an antioxidant, and the insulating external layer further contains an antioxidant. With this configuration, even if the communication cable is placed in a high-temperature environment, the material properties of the insulating coating and the insulating external layer tend to be stably maintained, and the heat resistance of the communication cable is effectively improved.

It is preferable that the insulating external layer is made of the flame-retardant resin composition, and 100 parts by mass of a polymer component included in the insulating external layer contains 5 parts by mass or more and 20 parts by mass or less of at least one polymer having a polyolefin, an olefin-based copolymer, or a styrene-based rubber as a main chain and a polar functional group that is not incorporated in the main chain. With this configuration, the bonding strength between the flame retardant and the polymer component and the bonding strength between the flame retardant auxiliary and the polymer component are increased due to the presence of the polar functional group. As a result, the uniformity of the material properties such as dielectric properties is improved in the flame-retardant resin composition, and the stability of the communication properties and the heat resistance are improved in the communication cable.

A wire harness of the present disclosure includes the communication cable described above. The aggregation diameter of an aggregate containing the flame retardant auxiliary in the flame-retardant resin composition included in at least one of the insulating coating and the insulating external layer included in the communication cable is limited to 50 µm or less, and therefore, the wire harness includes a communication cable that is excellent in the stability of the communication properties and the heat resistance.

A method for manufacturing a communication cable according to the present disclosure includes a step of preparing the flame-retardant resin composition, the step including: preparing a flame retardant auxiliary masterbatch in which a concentration of the flame retardant auxiliary in a polymer component is higher than that in a final product of the flame-retardant resin composition and that does not contain the flame retardant; and mixing the flame retardant auxiliary masterbatch with another component, wherein the communication cable described above is manufactured.

In the method for manufacturing a communication cable described above, the flame retardant auxiliary is not mixed with other components at once, but is added using a masterbatch formed by mixing the flame retardant auxiliary at a high concentration with the polymer component. Using the flame retardant auxiliary masterbatch separate from the flame retardant makes it possible to prevent the flame retardant auxiliary from entering the spaces between the flame retardant particles to form a coarse aggregate. When the flame retardant auxiliary is added using this masterbatch, it is easy to disperse the flame retardant auxiliary in the form of fine particles in the polymer component in the obtained flame-retardant resin composition, and thus a coarse aggregate containing the flame retardant auxiliary is less likely to be formed. Using the thus prepared flame-retardant resin composition makes it possible to manufacture a communication cable that is excellent in the stability of the communication properties and the heat resistance. The flame-retardant effect is also improved due to the flame retardant auxiliary being dispersed with high uniformity, and therefore, the addition amounts of the flame retardant and the flame retardant auxiliary can be reduced. Furthermore, due to the flame-retardant resin composition containing no coarse aggregates, manufacturing of an insulated wire that includes performing extrusion molding of the flame-retardant resin composition can be carried out under stable conditions, and high productivity is achieved.

Here, it is preferable that the concentration of the flame retardant auxiliary in the flame retardant auxiliary masterbatch is 70 mass % or more and 95 mass % or less. With this configuration, the effect of dispersing the flame retardant auxiliary in the form of fine particles is achieved to a high degree by using the flame retardant auxiliary masterbatch.

It is preferable that a melt flow rate of the flame retardant auxiliary masterbatch is 1 g/10 minutes or more and 10 g/10 minutes or less, the melt flow rate being measured with a load of 2.16 kg at 230° C. With this configuration, when the flame retardant auxiliary masterbatch is mixed with other components, the mixing uniformity can be improved, and thus a flame-retardant resin composition in which the flame retardant auxiliary is finely dispersed is easily obtained.

Details of Embodiments of the Present Disclosure

Hereinafter, a communication cable according to an embodiment of the present disclosure will be described in detail with reference to the drawings. In this specification, in terms of a material composition, the expression "a component is a main component of a material" refers to a state in which the component makes up 50 mass % or more of the total mass of the material. The polymers encompass those with a relatively low polymerization degree, such as oligomers. Unless otherwise stated, various properties that depend on measurement frequencies and/or measurement environments are determined at communication frequencies (e.g., frequencies within a range of 1 MHz to 50 MHz) at which communication cables are used, and are represented by the values obtained through measurements performed in the atmosphere at room temperature. In this specification, in terms of the communication cable, the term "communication properties" refers to communication-related properties, and also encompasses properties that may be classified into electrical properties.

(Overall Configuration of Communication Cable)

Figure 2:
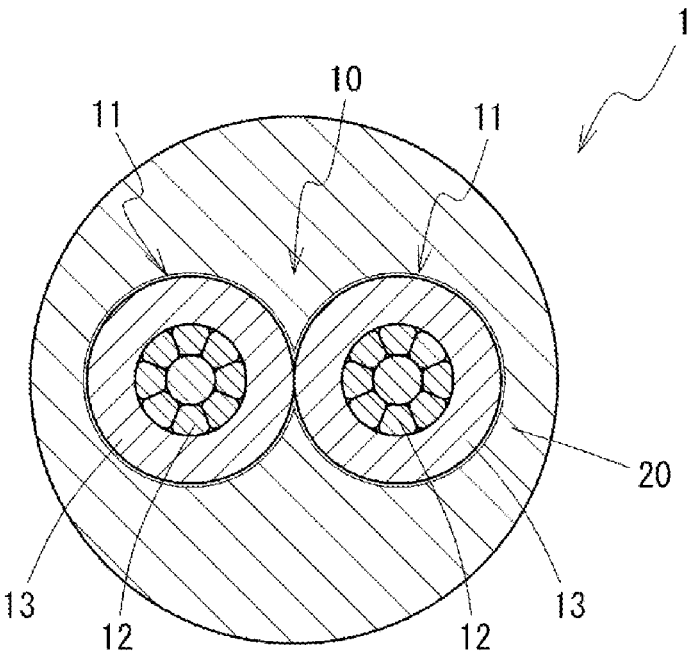
FIG. 2 is a cross-sectional view showing a communication cable with an insulating external layer having a solid structure as a communication cable according to an embodiment of the present disclosure.

FIGS. 1 and 2 show cross-sectional views of a communication cable 1 according to an embodiment of the present disclosure cut in a direction perpendicular to the axial direction. The communication cable 1 includes a signal wire 10. The signal wire 10 includes a pair of insulated wires 11.

The communication cable 1 further includes an insulating external layer (sheath) 20 covering the outer circumference of the signal wire 10. The insulating external layer 20 may have a hollow structure shown in FIG. 1 or a solid structure shown in FIG. 2.

In the aspect (loose jacket type) shown in FIG. 1 in which the insulating external layer 20 has a hollow structure, some regions of the inner circumferential surface of the insulating external layer 20 are in contact with the insulated wires 11 included in the signal wire 10, and there are spaces between the insulating external layer 20 and the signal wire 10. Meanwhile, in the aspect (solid jacket type) shown in FIG. 2 in which the insulating external layer 20 has a solid structure, spaces other than inevitable ones are not provided between the insulating external layer 20 and the insulated wires 11 included in the signal wire 10, and the material constituting the insulating external layer 20 is in intimate contact with substantially all of the regions on the surfaces of the insulated wires 11 that are exposed on the outside of the overall signal wire 10. Note that a space that may be inevitably generated between the insulating external layer 20 and the insulated wires 11 included in the signal wire 10 refers to a space corresponding to a porosity of approximately less than 5%. Here, the term "porosity" refers to a ratio of the area of the space to the area of the region surrounded by the outer circumferential surface of the insulating external layer 20 in a cross section of the communication cable 1 perpendicular to the axial direction.

Each of the insulated wires 11 included in the signal wire 10 includes a conductor 12 and an insulating coating 13 covering the outer circumference of the conductor 12. Although the signal wire 10 may have a configuration of a parallel pair wire in which a pair of insulated wires 11 are disposed in parallel and are in contact with each other in the state in which the axial directions thereof extend in the same direction in parallel, it is preferable to that the signal wire 10 has a configuration of a twisted pair wire formed by twisting a pair of insulated wires 11 together. Compared with the parallel pair wire, the twisted pair wire is excellent in an effect of stably maintaining the positions of the pair of insulated wires 11 relative to each other, and exhibits stable communication properties.

In the communication cable 1, a differential signal is input to the signal wire 10. The communication cable 1 has a characteristic impedance of $100 \pm 10\Omega$. This characteristic impedance corresponds to that required of an Ethernet communication cable to be installed in an automobile. Although there is no particular limitation on the frequency applied to the communication cable 1, it is preferable that the communication cable 1 can be used at least at frequencies within a range of 1 MHz to 50 MHz.

Although various metal materials can be used as the material for forming the conductor 12 of the insulated wire 11 included in the signal wire 10, it is preferable to use a copper alloy from the viewpoint of improving the transmission properties of the signal wire 10 while maintaining the strength, etc. Although the conductor 12 may be constituted by a solid wire, it is preferable that the conductor 12 is constituted by a twisted wire formed by twisting a plurality of (e.g., seven) strands together from the viewpoint of improving the flexural flexibility, etc. In this case, a compressed twisted wire formed by performing compression molding after twisting strands together may be used. In the case where a twisted wire is used as the conductor 12, all the strands included in this twisted wire may be the same, or two or more types of strands may be used.

The insulating coating 13 is made of a resin composition in which an olefin-based polymer is used as a base resin. That is to say, the insulating coating 13 contains at least one selected from polyolefins and olefin-based copolymers as a polymer component. Although the component composition of the insulating coating 13 will be described in detail later, at least one of the insulating coating 13 and the insulating external layer 20 is made of a flame-retardant resin composition containing a predetermined flame retardant and a predetermined flame retardant auxiliary.

Although there is no particular limitation on the diameter of the conductor 12 and the thickness of the insulating coating 13, the cross-sectional area of the conductor is preferably less than 0.22 mm$^2$ and particularly preferably 0.15 mm$^2$ or less from the viewpoint of reducing the diameter of the insulated wire 11, etc. Also, the thickness of the insulating coating 13 is preferably 0.30 mm or less and particularly preferably 0.20 mm or less. In the case where the cross-sectional area of the conductor and the thickness of the coating described above are employed, the outer diameter of the insulated wire 11 can be 1.0 mm or less, or furthermore 0.90 mm or less. The characteristic impedance of the communication cable 1 can be easily kept within a range of, for example, $100 \pm 10\Omega$ by employing the cross-sectional area of the conductor and the thickness of the coating described above. Furthermore, it is preferable that the insulating coating 13 is thinner than the insulating external layer 20.

An aspect in which the twist pitch of the twisted pair wire constituted by a pair of insulated wires 11 is 12 mm or more and 30 mm or less can be shown as an example. It is preferable to employ, as the structure of the twisted pair wire, a twist structure in which the insulated wires 11 are not twisted about a twisting axis. That is to say, a structure is preferable in which the relative upward, downward, leftward, and rightward directions of portions of the insulated wire 11 with respect to the axis of the insulated wire 11 itself do not change along the twisting axis of the twisted pair wire. With such a structure, a change in the distance between the two insulated wires 11 in a single pitch of the twist structure is suppressed, thus making it easy to stabilize the communication properties throughout the communication cable 1.

In the communication cable 1, the insulating external layer 20 functions to protect the signal wire 10, stabilize the relative positions of the insulated wires 11 included in the signal wire 10, and impart flame retardancy to the communication cable 1, for example. As described above, the insulating external layer 20 may have a hollow structure or a solid structure. As the insulating coating 13, the insulating external layer 20 is also made of a resin composition in which an olefin-based polymer is used as a base resin. That is to say, the insulating external layer 20 contains at least one selected from polyolefins and olefin-based copolymers as a polymer component. Although the component composition of the insulating external layer 20 will be described in detail later, at least one of the insulating coating 13 and the insulating external layer 20 is made of a flame-retardant resin composition containing a predetermined flame retardant and a predetermined flame retardant auxiliary.

It is sufficient that the thickness of the insulating external layer 20 is set as appropriate such that the effects of protecting the signal wire 10, maintaining the relative positions of the insulated wires 11 in the signal wire 10, imparting flame retardancy, and the like are sufficiently obtained, and a desired characteristic impedance is obtained. It is sufficient that the thickness of the thinnest portion is 0.2 mm or more, and more preferably 0.3 mm or more. Meanwhile, it is sufficient that the thickness of the insulating external layer 20 is 1.0 mm or less, and more preferably 0.8 mm or less, in view of reducing the effective dielectric constant, securing a characteristic impedance within a predetermined range, and reducing the diameter of the overall communication cable 1. Also, it is sufficient that the outer diameter of the overall communication cable 1, which is defined by the outer circumferential surface of the insulating external layer 20, is 4.0 mm or less, or furthermore 3.5 mm or less. In the case where the thickness of the insulating external layer 20 varies, such as a case where the insulating external layer 20 has a solid structure, it is sufficient that the average diameter falls within the range above.

Although providing another layered member between the insulating external layer 20 and the signal wire 10 in the communication cable 1 is not prohibited, it is preferable that such a layered member is not provided. Examples of the layered member include noise shielding members made of a metal, such as a metal foil and a metal braid. The noise shielding member reduces an influence of electromagnetic noise on a signal transmitted by the signal wire 10, but the overall structure of the communication cable 1 is simplified by employing a configuration in which the noise shielding member is not provided. In the case where the noise shielding member is not provided, the material properties of the insulating coating 13 and the insulating external layer 20 relatively have a great influence on the communication properties of the communication cable 1. However, with the communication cable 1 according to this embodiment, such an influence can be reduced since the flame-retardant resin composition constituting at least one of the insulating coating 13 and the insulating external layer 20 has a predetermined component composition.

(Material Configurations of Insulating Coating and Insulating External Layer)

(1) Outline of Material Configurations

As described above, in the communication cable 1 according to this embodiment, at least one of the insulating coating 13 included in the signal wire 10 and the insulating external layer 20 covering the outer circumference of the signal wire 10 is made of a predetermined flame-retardant resin composition. In this flame-retardant resin composition, an olefin-based polymer is used as a base resin, and a flame retardant containing a brominated flame retardant and a flame retardant auxiliary containing antimony trioxide are contained. In this flame-retardant resin composition, the aggregation diameter of an aggregate containing the flame retardant auxiliary is 50 μm or less.

Three types of aspects below can be considered as an aspect of the communication cable 1 in which at least one of the insulating coating 13 and the insulating external layer 20 is made of the predetermined flame-retardant resin composition described above.

Aspect 1: Both the insulating coating 13 and the insulating external layer 20 are made of the predetermined flame-retardant resin composition.

Aspect 2: The insulating external layer 20 is made of the predetermined flame-retardant resin composition, and the insulating coating 13 is made of a resin composition (another type of resin composition) other than the predetermined flame-retardant resin composition.

Aspect 3: The insulating coating 13 is made of the predetermined flame-retardant resin composition, and the insulating external layer 20 is made of another type of resin composition.

Although the communication cable 1 may have any of the configurations shown in the three types of aspects above, an aspect in which at least the insulating external layer 20 is made of the predetermined resin composition is preferable. That is to say, it is preferable that the communication cable 1 has the configuration shown in Aspect 1 or Aspect 2. The predetermined flame-retardant resin composition exhibits a high flame-retardant effect, and when used as a constituent material of the insulating external layer 20 that constitutes the outer circumferential portion of the overall communication cable 1 and occupies a large volume, the flame-retardant resin composition significantly improves the flame retardancy of the communication cable 1.

In the case where the communication cable 1 has the configuration shown in Aspect 1 and both the insulating coating 13 and the insulating external layer 20 are made of the predetermined flame-retardant resin composition, the flame-retardant resin compositions included in these two portions may have the same composition. Alternatively, the flame-retardant resin compositions in these two portions may have different component compositions as long as both of the flame-retardant resin compositions satisfy the configuration of the predetermined flame-retardant resin composition. For example, the flame-retardant resin compositions may differ from each other in the specific types and contents of the base resin, the flame retardant, the flame retardant auxiliary, and other additives that are optionally added. In all of Aspects 1, 2, and 3, the insulating coating 13 and/or the insulating external layer 20 included in the communication cable 1 may have a plurality of layers, and in this case, it is sufficient that at least one layer of the layers included in the insulating coating 13 and the insulating external layer 20 is made of the predetermined flame-retardant resin composition.

In the case where the only one of the insulating coating 13 and the insulating external layer 20 in the communication cable 1 is made of the predetermined flame-retardant resin composition as in Aspects 2 and 3, there is no limitation on the component composition of the other type of resin composition included in the other. The other type of resin composition may contain neither a flame retardant nor a flame retardant auxiliary, or may contain a flame retardant and a flame retardant auxiliary of types different from those in the predetermined flame-retardant resin composition. The other type of resin composition is preferably a non-flame-retardant resin composition containing neither a flame retardant nor a flame retardant auxiliary. In the case where the other type of resin composition contains a flame retardant and/or a flame retardant auxiliary as well, it is preferable that the flame retardant and the flame retardant auxiliary do not form an aggregate with a particle diameter greater than 50 μm.

(2) Composition and Properties of Resin Composition

As described above, in the communication cable 1 according to the embodiment of the present disclosure, at least one of the insulating coating 13 and the insulating external layer 20 is made of a flame-retardant resin composition in which an olefin-based polymer is used as a base resin, and a flame retardant containing a brominated flame retardant and a flame retardant auxiliary containing antimony trioxide are contained. Hereinafter, details of the composition and properties of this flame-retardant resin composition will be described. Note that, excluding the items relating to the flame retardant and the flame retardant auxiliary, the following configuration described in the following descriptions of the composition and properties of the resin composition can be favorably applied to another type of resin composition constituting a layer that is not made of this flame-retardant resin composition in the insulating coating 13 and the insulating external layer 20, unless otherwise stated.

(2-1) Base Resin

The base resins of the resin compositions included in the insulating coating 13 and the insulating external layer 20 contain an olefin-based polymer. That is to say, the base resins contain at least one selected from polyolefins and olefin-based copolymers (olefin-containing copolymers). Examples of the polyolefins include polyethylene, polypropylene, and the like. Examples of the olefin-based copolymers include: ethylene-based copolymers such as ethylene-α olefin copolymers, ethylene-vinyl acetate copolymers, ethylene-acrylic acid ester copolymer, and ethylene-methacrylic acid ester copolymers; and propylene-based copolymers such as propylene-α olefin copolymers, propylene-vinyl acetate copolymers, propylene-acrylic acid ester copolymer, and propylene-methacrylic acid ester copolymers. The olefin-based polymers may be used alone or in combination of two or more. It is preferable that the base resins contain at least one of polypropylene, polyethylene, and an ethylene-propylene copolymer as the olefin-based polymer. Although a polymer component included in the resin composition may contain a polymer species other than the olefin-based polymer, it is preferable that the polymer component contains the olefin-based polymer as a main component.

Furthermore, it is preferable that the polymer component included in the resin composition contains a polymer having a polar functional group, as a portion of the olefin-based polymer or a polymer species added in addition to the olefin-based polymer. The polymer having a polar functional group has high affinity to antimony trioxide serving as a flame retardant auxiliary and inorganic particles that are optionally added, such as those made of metal hydroxides, zinc oxide, and the like, and increase the bonding strength between the polymer component and the inorganic particles. As a result, the material strength of the resin composition can be increased. Examples of the polar functional group include a carboxylic acid group, an acid anhydride group, an epoxy group, a hydroxyl group, an amino group, a silane group, an acrylic group, and a methacrylic group. In particular, a carboxylic acid group and an acid anhydride group can be favorably employed from the viewpoint of an excellent effect of increasing the material strength, etc. It is preferable to introduce the polar functional group through graft polymerization or the like without incorporating the polar functional group into the main chain of the polymer. In this case, the above-described olefin-based polymer, namely a polyolefin or olefin-based copolymer, can be favorably used as the polymer species constituting the main chain. Alternatively, a polymer other than the olefin-based polymer, such as styrene-based rubber, may also be used. Another method for introducing a polar functional group into a polymer is a method for incorporating a polar functional group into the main chain of a polymer through copolymerization using a molecule having a polar functional group. For example, it is sufficient that a copolymer of an olefin and a polymerizable molecule having a polar group is used as the olefin-based copolymer. In any case, it is sufficient that the content of the polar functional group is 0.05 parts by mass or more with respect to 100 parts by mass of the polymer component from the viewpoint of increasing the material strength-improving effect exhibited by the polar functional group. Meanwhile, the content thereof is preferably not more than 15 parts by mass from the viewpoint of making it easy to strip off the insulating coating 13 and the insulating external layer 20 when processing an end of the communication cable 1. Also, the content of the polymer having a polar functional group is preferably 5 parts by mass or more and 20 parts by mass or less with respect to 100 parts by mass of the polymer component.

As described later in the section "Material Properties of Resin Composition", when the insulating coating 13 is made of the flame-retardant resin composition, the resin composition included in the insulating coating 13 preferably has a flexural modulus of 500 MPa or more and 2000 MPa or less as a whole. Examples of an olefin-based polymer capable of achieving a flexural modulus within this range include homopolypropylene, and ethylene-propylene block copolymers in which the ethylene component amount is less than the propylene component amount. Meanwhile, when the insulating external layer 20 is made of the flame-retardant resin composition, the resin composition included in the insulating external layer 20 preferably has a flexural modulus of 200 MPa or more and 800 MPa or less as a whole. As an olefin-based polymer capable of achieving a flexural modulus within this range, a flexible polyolefin typified by a polypropylene elastomer can be favorably used. Specific examples thereof include copolymers containing polypropylene and a rubber component such as ethylene-propylene rubber, polyethylene rubber, or diene rubber.

(2-2) Flame Retardant

The flame retardant contained in the flame-retardant resin composition contains a brominated flame retardant. Although there is no particular limitation on the type of brominated flame retardant, it is preferable to use a brominated flame retardant having a phthalimide structure (e.g., ethylene bis(tetrabromophthalimide) or ethylene bis(tribromophthalimide)), or ethylene bis(pentabromophenyl). These brominated flame retardants contain a large amount of bromine, and are excellent in flame retardancy. Also, these brominated flame retardants have a high decomposition temperature, and therefore, when the communication cable 1 is placed in a high-temperature environment, or the communication cable 1 is manufactured through extrusion molding of the flame-retardant resin composition, deterioration is less likely to be induced by decomposition. The content of bromine in the brominated flame retardant is preferably 50 mass % or more. With this configuration, the amount of the brominated flame retardant added to the flame-retardant resin composition can be reduced, and as a result, it is possible to suppress aggregation or ununiform distribution of the flame retardant during mixing for preparing the flame-retardant resin composition. Also, it is possible to keep the mechanical properties of the obtained flame-retardant resin composition high.

The brominated flame retardants may be used alone or in combination of two or more. Examples of an aspect in which two or more types of brominated flame retardants are used include those in which the above-described brominated flame retardant having a phthalimide structure or ethylene bis(pentabromophenyl) is used together with a brominated flame retardant described below. Examples of the brominated flame retardant used together include ethylene bis (pentabromobenzene) (also known as bis(pentabromophenyl)ethane), tetrabromobisphenol A (abbreviated as TBBA), hexabromocyclododecane (abbreviated as HBCD), TBBA carbonate oligomers, TBBA epoxy oligomers, brominated polystyrene, TBBA-bis(dibromopropyl ether), poly(dibromopropyl ether), and hexabromobenzene (abbreviated as HBB).

The content of the brominated flame retardant in the flame-retardant resin composition is preferably 10 parts by mass or more, and more preferably 20 parts by mass or more, with respect to 100 parts by mass of the polymer component. With this configuration, a high flame-retardant effect is achieved. Meanwhile, the content of the brominated flame retardant is preferably controlled to 50 parts by mass or less, and more preferably 40 parts by mass or less, with respect to 100 parts by mass of the polymer component. With this configuration, it is possible to suppress aggregation or ununiform distribution of the flame retardant during mixing for preparing the flame-retardant resin composition. Also, the mechanical properties of the obtained flame-retardant resin composition can be kept high. When only a brominated flame retardant is used as the flame retardant, the content of the brominated flame retardant is preferably 15 parts by mass or more with respect to 100 parts by mass of the polymer component. Meanwhile, as described below, when a metal hydroxide is used together in the flame retardant, an aspect in which the content of the brominated flame retardant is less than 15 parts by mass is also preferable.

The flame-retardant resin composition may contain, as the flame retardant, only a brominated flame retardant, or another type of flame retardant in addition to a brominated flame retardant. In both cases where the flame retardant contains only a brominated flame retardant and contains a brominated flame retardant together with another type of flame retardant, it is preferable that the flame retardant does not form an aggregate having an aggregation diameter of more than 50 μm, as in the case of a flame retardant auxiliary, which will be described next.

Examples of the other type of flame retardant that can be used together with a brominated flame retardant include metal hydroxide flame retardants. The metal hydroxide flame retardant is a flame retardant that exhibits relatively high flame-retardant effect, which is not as high as that of a brominated flame retardant, and can be used at low cost. If only a brominated flame retardant is added as the flame retardant to the flame-retardant resin composition, the addition amount of the flame retardant can be reduced due to the brominated flame retardant exhibiting a high flame-retardant effect, and an influence of the flame retardant on the material properties and the communication properties can be reduced. Meanwhile, if a metal hydroxide flame retardant is used together with the brominated flame retardant, it is possible to reduce the usage of the brominated flame retardant and reduce the material cost required for the flame retardant. Also, a material dispersiveness problem is less likely to arise because the addition amounts of the brominated flame retardant and the flame retardant auxiliary, which are less dispersive substances, can be reduced.

Examples of a metal hydroxide capable of being used as a flame retardant include magnesium hydroxide, aluminum hydroxide, and zirconium hydroxide. Although any of these metal hydroxides may be used, it is preferable to use magnesium hydroxide because it is inexpensive and has excellent heat resistance. The metal hydroxide flame retardants may be used alone or in combination of two or more. The average particle diameter (D50) of the metal hydroxide flame retardant is preferably 0.5 μm or more. With this configuration, the particles are less likely to aggregate. Also, the average particle diameter of the metal hydroxide flame retardant is preferably 5 μm or less. With this configuration, the particles of the metal hydroxide flame retardant easily disperse in the resin component. In particular, the average particle diameter of the metal hydroxide flame retardant is preferably approximately 1 μm. The metal hydroxide flame retardant may be treated with a surface treatment agent such as a silane coupling agent, a higher fatty acid, or polyolefin wax for the purpose of improving the dispersiveness in the resin component, etc.

The content of the metal hydroxide flame retardant in the flame-retardant resin composition is preferably 20 parts by mass or more, and more preferably 30 parts by mass or more, with respect to 100 parts by mass of the polymer component. With this configuration, a high flame-retardant effect can be achieved. Meanwhile, the content of the metal hydroxide flame retardant is preferably 100 parts by mass or less, and more preferably 70 parts by mass or less, with respect to 100 parts by mass of the polymer component. With this configuration, it is possible to suppress aggregation or ununiform distribution of the flame retardant during mixing for preparing the flame-retardant resin composition. Also, the mechanical properties of the obtained flame-retardant resin composition can be kept high without being deteriorated because the interface between the flame retardant and the polymer component is reduced. In particular, the metal hydroxide flame retardant at a content as described herein can be added to the resin composition in favorable combination with the above-described preferable brominated flame retardant of 10 parts by mass or more and 50 parts by mass or less.

(2-3) Flame Retardant Auxiliary

The flame retardant auxiliary contains antimony trioxide, and serves to promote a flame-retardant action by the brominated flame retardant. It is preferable that the flame retardant auxiliary contains antimony trioxide as a main component. Furthermore, it is preferable that the flame retardant auxiliary contains 99 parts by mass or more of antimony trioxide. In this case, for example, minute particles obtained by pulverizing antimony trioxide produced in the form of mineral can be favorably used as the flame retardant auxiliary. The flame retardant auxiliary preferably has an average particle diameter of 3 μm or less, and more preferably 1 μm or less. With this configuration, the bonding strength at the interface between the flame retardant auxiliary and the polymer component can be increased. The flame retardant auxiliary may be treated with a surface treatment agent such as a silane coupling agent, a higher fatty acid, or polyolefin wax for the purpose of controlling the particle diameter, increasing the bonding strength at the interface with the polymer component, etc.

Although there is no particular limitation on the content of the flame retardant auxiliary in the flame-retardant resin composition, the total content of the flame retardant (all the flame retardants that include the brominated flame retardant and other flame retardants) and the flame retardant auxiliary is preferably 10 parts by mass or more, and more preferably 20 parts by mass or more, 30 parts by mass or more, or 40 parts by mass or more, with respect to 100 parts by mass of the polymer component. With this configuration, the flame-retardant resin composition has excellent flame retardancy. In particular, this total content is preferably 30 parts by mass or more in the flame-retardant resin composition included in the insulating external layer 20. Meanwhile, the above-mentioned total content is preferably 120 parts by mass or less, and more preferably 100 parts by mass or less, with respect to 100 parts by mass of the polymer component. With this configuration, it is possible to suppress aggregation or ununiform distribution of the flame retardant and the flame retardant auxiliary during mixing for preparing the flame-retardant resin composition. Also, the mechanical properties of the obtained flame-retardant resin composition can be kept high.

Furthermore, in terms of the mass ratio between the contents of the brominated flame retardant and the flame retardant auxiliary, the content of the flame retardant auxiliary is preferably ¼ or more and more preferably 1/3.5 or more when the content of the brominated flame retardant is taken as 1. With this configuration, the auxiliary flame-retardant effect exhibited by the flame retardant auxiliary is improved. Meanwhile, the content of the flame retardant auxiliary is preferably ½ or less and more preferably 1/2.5 or less when represented as a mass ratio as described above. That is to say, when the brominated flame retardant is added in an amount of 20 parts by mass or more and 50 parts by mass or less to 100 parts by mass of the polymer component, the content of the flame retardant auxiliary is preferably within a range of 5 parts by mass or more to 25 parts by mass or less. Most preferably, in terms of the ratio between the contents of the brominated flame retardant and the flame retardant auxiliary, the content of the flame retardant auxiliary is ⅓ when the content of the brominated flame retardant is taken as 1. The reason for this is that, when the brominated flame retardant and antimony trioxide react in equivalent amounts, the molar mass ratio of the brominated flame retardant to the antimony trioxide is approximately 3:1.

A flame retardant auxiliary containing antimony trioxide is prone to secondary aggregation. If a coarse aggregate containing the flame retardant auxiliary is formed in the flame-retardant resin composition, ununiform spatial distribution of the material properties of the flame-retardant resin composition including dielectric properties such as a dielectric constant and a dielectric dissipation factor tends to occur. With this configuration, stable communication properties are less likely to be achieved at any position in the communication cable 1. Also, due to a coarse aggregate in the form of a solid particle being contained, the material properties tend to change when the flame-retardant resin composition is placed in a high-temperature environment, and as a result, the communication properties of the communication cable 1 may change. That is to say, the heat resistance of the communication cable 1 decreases. Furthermore, if the flame-retardant resin composition contains a coarse aggregate, the productivity decreases when the communication cable 1 is manufactured through extrusion molding of the flame-retardant resin composition. For example, it is difficult to keep the state of the flame-retardant resin composition constant during the manufacturing, and when the communication cable 1 is continuously manufactured, the properties of the communication cables 1 manufactured during the manufacturing period between the initial stage and the final stage may vary. In particular, the insulating coating 13 is often formed as a thin coating for the purpose of reducing the diameter, and therefore, such problems especially tend to arise in the flame-retardant resin composition included in the insulating coating 13.

However, in the communication cable 1 according to the present embodiment, the aggregation diameter of an aggregate containing the flame retardant auxiliary formed in the flame-retardant resin composition is controlled to 50 μm or less. That is to say, the aggregation diameter of the aggregate (the length of the longest straight line extending across the aggregate) is up to 50 μm or less. As described above, the formation of a coarse aggregate is suppressed, and thus the flame-retardant resin composition is less likely to be affected by the formation of a coarse aggregate. That is to say, ununiformity of the material properties such as dielectric properties caused by the formation of a coarse aggregate, instability of the communication properties of the communication cable 1 caused by this ununiformity, and a decrease in the heat resistance are suppressed. Also, the productivity of the communication cable 1 is less likely to occur. In the case where the insulating coating 13 is made of the flame-retardant resin composition as a thin coating, these effects are also enjoyed. It is particularly preferable that the aggregation diameter of the aggregate containing the flame retardant auxiliary is 40 μm or less, or furthermore 30 μm or less, from the viewpoint of further improving the above-mentioned effects. Note that the state in which the aggregation diameter of the aggregate is smaller than or equal to a predetermined upper limit also encompasses an aspect in which an aggregate containing the flame retardant auxiliary is not formed in the flame-retardant resin composition, and this aspect is most preferable. Also, the aggregate containing the flame retardant auxiliary, which is the target herein, encompasses an aggregate that contains substantially only the flame retardant auxiliary as well as an aggregate that contains, in addition to the flame retardant auxiliary, the flame retardant and optional components (e.g., other additives).

There is no particular limitation on a means for reducing the aggregation diameter of the aggregate containing the flame retardant auxiliary. However, as is employed in a method for manufacturing a communication cable according to an embodiment of the present disclosure, which will be described later, it is preferable to mix the flame retardant auxiliary with other components as a masterbatch formed by mixing the flame retardant auxiliary at a high concentration in the polymer component, rather than mixing the flame retardant auxiliary in the form of a powder with other components as it is. With this configuration, it is possible to finely disperse the flame retardant auxiliary in the flame-retardant resin composition without the formation of a coarse aggregate.

(2-4) Other Additives

The resin composition may contain an additive component other than the flame retardant and the flame retardant auxiliary as appropriate as long as the properties derived from the above-described polymer component, flame retardant, and flame retardant auxiliary are not significantly impaired. The resin composition can contain an antioxidant, for example, as a preferable additive. The antioxidant functions as a favorable additive in both the case where the resin composition is included in the insulating coating 13 and the case where the resin composition is included in the insulating external layer 20. Also, the resin composition may also contain a metal deactivator. In particular, it is preferable to add the metal deactivator to the resin composition included in the insulating coating 13, which is a layer in contact with the conductor 12 made of a metal. Note that, in the case of adding various additives, it is preferable that, in the resin composition, these additives do not form a particle with a particle diameter of 50 μm or more or an aggregate with an aggregation diameter of 50 μm or more, either, as the case of the flame retardant auxiliary.

Favorable examples of the antioxidant include hindered phenol-based antioxidants and thiol-based antioxidants. The antioxidants may be used alone or in combination of two or more.

It is preferable to add the hindered phenol-based antioxidant in an amount of 1 part by mass or more with respect to 100 parts by mass of the polymer component from the viewpoint of achieving a sufficient antioxidant effect and stably maintaining the properties of the communication cable 1, such as a characteristic impedance, for a long period of time. Meanwhile, it is preferable that the addition amount of the hindered phenol-based antioxidant is 5 parts by mass or less with respect to 100 parts by mass of the polymer component from the viewpoint to suppressing bloom on the layer surface caused by diffusion.

Specific examples of the hindered phenol-based antioxidant include pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, N,N'-hexane-1,6-diyl bis[3-(3,5-di-tert-butyl-4-hydroxyphenylpropionamide], benzenepropanoic acid, 3,5-bis(1,1-dimethylethyl)-4-hydroxy-C7 to C9 side-chain alkyl esters, 2,4-dimethyl-6-(1-methylpentadecyl)phenol, diethyl [[3,5-bis(1,1-dimethylethyl)-4-hydroxyphenyl]methyl] phosphonate, 3,3',3",5,5'5"-hexa-tert-butyl-a,a',a"-(mesitylene-2,4,6-triyl)tri-p-cresol, calcium diethyl bis[[[3,5-bis(1,1-dimethylethyl)-4-hydroxyphenyl]methyl]phosphonate], 4,6-bis(octylthiomethyl)-o-cresol, ethylene bis(oxyethylene)bis[3-(5-tert-butyl-4-hydroxy-m-tolyl)propionate], hexamethylene bis[3-(3,5-di-tert-butyl-4-hydroxyphenyl)propionate, 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-triazine-2,4,6(1H,3H,5H)-trione, 2,6-tert-butyl-4-(4,6-bis(octylthio)-1,3,5-triazin-2-ylamino)phenol, 2,6-di-tert-butyl-4-methylphenol, 2,2'-methylene bis(4-methyl-6-tert-butylphenol), 4,4'-butylidene bis(3-methyl-6-tert butylphenol), 4,4'-thio bis(3-methyl-6-tert-butylphenol), and 3,9-bis[2-(3-(3-tert-butyl-4-hydroxy-5-methylphenyl)-propynoxy)-1,1-dimethylethyl]-2,4,8,10-tetraoxaspiro(5,5)undecane. These hindered phenol-based antioxidants may be used alone or in combination of two or more.

It is preferable to add the thiol-based antioxidant in an amount of 1 part by mass or more with respect to 100 parts by mass of the polymer component from the viewpoint of achieving a sufficient antioxidant effect and stably maintaining the communication properties of the communication cable 1, such as a characteristic impedance, for a long period of time. Meanwhile, it is preferable that the addition amount of the thiol-based antioxidant is 10 parts by mass or less with respect to 100 parts by mass of the polymer component.

Specific examples of the thiol-based antioxidant include 2-mercaptobenzimidazole, 2-mercaptomethylbenzimidazole, 4-mercaptomethylbenzimidazole, 5-mercaptomethylbenzimidazole and zinc salts of these compounds. It is preferable to use 2-mercaptobenzimidazole and a zinc salt thereof because these substances have a high melting point and are less likely to sublime during mixing, and are thus stable at high temperatures. These thiol-based antioxidants may be used alone or in combination of two or more.

In the case where the thiol-based antioxidant is added to the resin composition, it is preferable to add zinc oxide serving as an auxiliary together with the thiol-based antioxidant. It is sufficient that the preferable addition amount of the zinc oxide is substantially the same as that of the thiol-based antioxidant, and there is no particularly strict limitation. The zinc oxide is not particularly limited, and, for example, zinc oxide obtained through air-oxidation of zinc vapor produced by adding a reducing agent such as coke to zinc ore and firing the mixture, or zinc oxide obtained using zinc sulfate or zinc chloride as a raw material can be used. The average particle diameter of the zinc oxide is preferably 3 μm or less and more preferably 1 μm or less. With this configuration, the bonding strength at the interface between the zinc oxide particle and the polymer component can be increased, and the dispersiveness can be improved.

Alternatively, zinc sulfide may be added to the resin composition together with the antioxidant. Zinc sulfide contains both zinc and sulfur, and can thus be used as an alternative to a combination of the thiol-based antioxidant and zinc oxide. However, the performance of zinc sulfide as an antioxidant is lower than that of the combination of the thiol-based antioxidant and zinc oxide, and therefore, it is preferable to add the zinc sulfide in a larger amount than the total amount of the thiol-based antioxidant and the zinc oxide. The average particle diameter of the zinc sulfide is also preferably 3 μm or less and more preferably 1 μm or less.

In the case of the resin composition included in the insulating coating 13, it is preferable to use the hindered phenol-based antioxidant alone as the antioxidant. Meanwhile, in the case of the resin composition included in the insulating external layer 20, it is preferable to use the hindered phenol-based antioxidant and the thiol-based antioxidant together and furthermore add zinc oxide as well. In the insulating external layer 20, it is preferable to suppress aging in step with the surrounding environment, namely oxidation deterioration induced by migration of the components between the adjacent materials, and an effective means for achieving this is to using a plurality of additives having an antioxidant effect in combination. The reason for this is that, even if some types of antioxidants migrate during an oxidation deterioration reaction cycle, another type of antioxidant capable of suppressing an oxidation deterioration reaction remains in the insulating external layer 20, thus making it possible to suppress the progress of the deterioration reaction cycle.

The metal deactivator serves to prevent the polymer component from being oxidized due to contact with a metal such as copper. Examples of the metal deactivator include hydrazine derivatives such as 2,3-bis {3-(3,5-di-tert-butyl-4-hydroxyphenyl)propionyl}propionohydrazide, and salicylic acid derivatives such as 3-(N-salicyloyl)amino-1,2,4-triazole. It is preferable that the addition amount of the metal deactivator is 1 part by mass or more with respect to 100 parts by mass of the polymer component from the viewpoint of achieving a sufficient addition effect. Meanwhile, it is preferable that the addition amount thereof is 10 parts by mass or less with respect to 100 parts by mass of the polymer component from the viewpoint to suppressing bloom on the layer surface.

(2-5) Material Properties of Resin Composition

The relative dielectric constant of the resin composition (the overall composition containing the components) is preferably within a range of 1.9 or more to 3.2 or less. The relative dielectric constant has an influence of the characteristic impedance of the communication cable 1, and there is a tendency that the higher the relative dielectric constants of the resin compositions included in the insulating coating 13 and the insulating external layer 20 are, the lower the characteristic impedance is. Also, the lower the relative dielectric constants of the resin compositions included in the insulating coating 13 and the insulating external layer 20 are, the weaker the electromagnetic bonding between the conductor 12 and a metal member present around the communication cable 1 can be made, and therefore, the mode conversion properties are improved. In particular, the transparent mode conversion can be reduced. In the communication cable 1, a characteristic impedance of 100±10Ω and high mode conversion properties can be easily achieved due to the resin compositions included in the insulating coating 13 and the insulating external layer 20 having a relative dielectric constant within the range above. The relative dielectric constant of the resin composition depends on the component composition of the resin composition, and there is a tendency that the higher the contents of highly polar components are, the higher the relative dielectric constant is. Accordingly, when the resin composition contains, in large amounts, a polymer having a polar functional group and polar inorganic compounds such as a metal hydroxide flame retardant and antimony trioxide flame retardant auxiliary, the relative dielectric constant increases.

In the communication cable 1, when both the insulating coating and the insulating external layer are made of the flame-retardant resin composition, it is preferable that the relative dielectric constant of the resin composition included in the insulating coating 13 is lower than that of the resin composition included in the insulating external layer 20. The insulating coating 13 directly covers the outer circumference of the conductor 12 through which a signal is transmitted, and it is possible to suppress loss of the transmitted signal by reducing the relative dielectric constant of the insulating coating 13. Meanwhile, the insulating external layer 20 is disposed at a position far away from the conductor 12 and thus contributes less to the loss of the signal. Accordingly, the relative dielectric constant of the insulating external layer 20 may be increased by adding the flame retardant and the flame retardant auxiliary in such amounts that enable a sufficient flame-retardant effect to be exhibited. The relative dielectric constant of the resin composition can be measured, for example, in conformity with JIS C 2138.

When the insulating coating 13 is made of the flame-retardant resin composition, the relative dielectric constant of the insulating coating 13 is substantially 1.9 or more, and preferably 2.0 or more, in view of the contents of polar components, etc. Meanwhile, the relative dielectric constant of the insulating coating 13 is less than 3.5, and preferably less than 2.8, from the viewpoint of sufficiently suppressing signal transmission loss. When the insulating external layer 20 is made of the flame-retardant resin composition, the relative dielectric constant of the insulating external layer 20 is substantially 2.3 or more, and preferably 2.4 or more, from the viewpoint of blending the flame retardant and the flame retardant auxiliary in sufficient amounts. Meanwhile, the relative dielectric constant of the insulating external layer 20 is less than 3.5, and preferably less than 3.2, from the viewpoint of preventing the flame retardant and the like from being blended in excessive amounts, etc.

The resin compositions included in the insulating coating 13 and the insulating external layer 20 preferably has a flexural modulus of 200 MPa or more and 2000 MPa or less. The flexural modulus of the resin composition can be evaluated, for example, by performing a three-point bending test in conformity with JIS K 7171.

When the flexural modulus of the resin composition is 200 MPa or more, high resistances against external factors, such as abrasion resistance, chemical resistance, and oil resistance, can be secured in the resin composition. The flexural modulus is more preferably 300 MPa or more. Meanwhile, when the flexural modulus of the resin composition is 2000 MPa or less, high flexural flexibility can be achieved. The flexural modulus is more preferably 1500 MPa or less. In particular, when both the insulating coating and the insulating external layer are made of the flame-retardant resin composition, it is preferable that the flexural modulus of the resin composition included in the insulating external layer 20 is lower than that of the resin composition included in the insulating coating 13. In the communication cable 1 in which the pair of insulated wires 11 serves as the signal wire 10, the insulating coating 13 is often formed as a thin coating, whereas it is also assumed that the insulating external layer 20 is formed as a thick layer from the viewpoint of improving the flame retardancy and improving the protection of the signal wire 10, etc. However, even in the case where a thick insulating external layer 20 is formed, when the flexural modulus of the resin composition included in the insulating external layer 20 is lower than the that of the resin composition included in the insulating coating 13, high flexural flexibility can be secured throughout the communication cable 1. Also, a polymer component having a low flexural modulus tends to be easily dispersed in the state of holding particles of additives such as the flame retardant and the flame retardant auxiliary.

In particular, the flexural modulus of the resin composition included in the insulating coating 13 is preferably 500 MPa or more and more preferably 800 MPa or more, and preferably 2000 MPa or less and more preferably 1500 MPa or less, within the above-mentioned flexural modulus range of 200 MPa or more and 2000 MPa or less. A resin composition having a relatively high elastic modulus as described above has high abrasion resistance and high chemical resistance. In addition, the insulating coating 13 is less likely to be crushed during molding. Meanwhile, the flexural modulus of the resin composition included in the insulating external layer 20 is preferably 200 MPa or more and more preferably 300 MPa or more, and preferably 800 MPa or less and more preferably 700 MPa or less. When the flexural modulus of the resin composition is 200 MPa or more, or furthermore 300 MPa or more, the insulating external layer 20 has high oil resistance. Therefore, even if the communication cable 1 is used for a long period of time, it is possible to prevent oil from migrating from the surrounding environment and affecting the communication properties of the communication cable 1, such as a characteristic impedance. Meanwhile, when the flexural modulus of the resin composition is 800 MPa or less, or furthermore 700 MPa or less, high flexural flexibility is achieved.

It is preferable that the resin compositions included in the insulating coating 13 and the insulating external layer 20 have high crystallinity from the viewpoint of improving the chemical resistance and the abrasion resistance. Meanwhile, if the crystallinity is too high, extensibility and flexibility of the resin composition tend to decrease. In particular, the insulating coating 13 is often formed as a thin coating, and therefore, the crystallinity is preferably 70% or more from the viewpoint of securing the mechanical properties such as abrasion resistance. However, the crystallinity is preferably controlled to 90% or less from the viewpoint of avoiding breakage caused by impact at low temperatures, etc. It is preferable that the crystallinity of the insulating external layer 20 is 40% or more and 70% or less. The crystallinity of the resin composition can be evaluated based on the area of a melting peak obtained through differential scanning calorimetry (DSC).

(3) Relationship Between Form of Insulating External Layer and Composition of Resin Composition As described above, in the communication cable 1 according to this embodiment, the insulating external layer 20 may have the hollow structure shown in FIG. 1 or the solid structure shown in FIG. 2. As long as at least one of the insulating external layer 20 and the insulating coating 13 is made of the predetermined flame-retardant resin composition described above, the other may be made of a non-flame-retardant resin composition containing neither the flame retardant nor the flame retardant auxiliary. However, some combinations of the structure of the insulating external layer 20 and the presence or absence of a flame retardant in the insulating external layer 20 and the insulating coating 13 are preferable.

In the case where the insulating external layer 20 has the hollow structure shown in FIG. 1, an air layer is formed around the outer circumference of the signal wire 10, and thus the communication properties of the communication cable 1, such as the mode conversion properties, tend to be improved. However, in the case where the insulating external layer 20 has the hollow structure, the flame retardancy of the communication cable 1 is less likely to be improved. The reason for this is that, in the case where the communication cable 1 burns, combustion easily progresses due to supply of air from the space surrounded by the insulating external layer 20. Even if the insulating external layer 20 contains the flame retardant and the flame retardant auxiliary, it is difficult to achieve high flame retardancy by only the flame retardant and the flame retardant auxiliary contained in the insulating external layer 20 because the insulating external layer 20 has a small volume compared with the case where the insulating external layer 20 has a solid structure. Accordingly, in the case where the insulating external layer 20 has the hollow structure, it is preferable that not only the insulating external layer 20 but also the insulating coating 13 is made of the above-described predetermined flame-retardant resin composition containing the flame retardant and the flame retardant auxiliary. That is to say, it is preferable that the communication cable 1 has the configuration shown in Aspect 1 above. Also, it is preferable that the insulating external layer 20 contains the flame retardant and the flame retardant auxiliary in relatively large amounts. For example, the total content of the flame retardant and the flame retardant auxiliary in the insulating external layer 20 is more preferably 40 parts by mass or more.

Meanwhile, in the case where the insulating external layer 20 has the solid structure shown in FIG. 2, comparing with the case where the insulating external layer 20 has the hollow structure, the communication properties of the communication cable 1 is less likely to be improved, but when the insulating external layer 20 contains the flame retardant and the flame retardant auxiliary, the communication cable 1 has a high flame-retardant effect overall because the insulating external layer 20 has a large volume. Furthermore, in the case where the communication cable 1 burns, the constituent materials of the insulating external layer 20 and the insulating coating 13 can easily flow and migrate therebetween, and thus the flame retardant and the flame retardant auxiliary contained in the insulating external layer 20 can also exhibit the flame-retardant effect in the insulating coating 13. Accordingly, as long as the insulating external layer 20 contains the flame retardant and the flame retardant auxiliary, the insulating coating 13 may contain neither the flame retardant nor the flame retardant auxiliary. That is to say, even when the communication cable 1 has the configuration shown in Aspect 2 above and the insulating coating 13 is made of a non-flame-retardant resin composition, the communication cable 1 can exhibit a high flame-retardant effect overall. Also, even when the communication cable 1 has the configuration shown in Aspect 1 in which both the insulating external layer 20 and the insulating coating 13 contain the flame retardant and the flame retardant auxiliary, the contents of the flame retardant and the flame retardant auxiliary in the insulating coating 13 can be reduced.

It is possible to reduce the dielectric constant and the dielectric dissipation factor of the insulating coating 13 by adding neither the flame retardant nor the flame retardant auxiliary to the insulating coating 13 or reducing the contents of the flame retardant and the flame retardant auxiliary. Accordingly, the loss of the transmitted signal and the transparent mode conversion are reduced, and thus the communication properties can be improved. The volume of the insulating external layer 20 is larger than that of the insulating coating 13, and the flame-retardant effect can be improved thanks to the large volume. Therefore, the contents of the flame retardant and the flame retardant auxiliary in the insulating external layer 20 in terms of a concentration can be comparatively reduced. For example, even when the total content of the flame retardant and the flame retardant auxiliary in the insulating external layer 20 is controlled to 50 parts by mass or less, sufficient flame retardancy can be achieved.

In the case where the insulating external layer 20 has a hollow structure, and a configuration of Aspect 1 is employed in which both the insulating external layer 20 and the insulating coating 13 are made of the predetermined flame-retardant resin composition containing the flame retardant and the flame retardant auxiliary, it is preferable that, in the insulating coating 13, the contents (contents with respect to the content of the polymer component in the layer) of compounds added as the flame retardant and the flame retardant auxiliary are lower than or equal to those in the insulating external layer 20. In particular, when both the insulating coating and the insulating external layer are made of the flame-retardant resin composition, and when the contents of the flame retardant and the flame retardant auxiliary in the insulating coating 13 are lower than those in the insulating external layer 20, the relative dielectric constant of the insulating coating 13 is reduced, thus making it likely that favorable communication properties are achieved.

Meanwhile, when the types and contents of compounds added as the flame retardant and the flame retardant auxiliary in the insulating coating 13 match those in the insulating external layer 20, it is possible to use loose standards for the manufacturing tolerances of the communication cable 1 and improve the productivity of the communication cable 1. The communication properties of the communication cable 1 depend on the thicknesses of the insulating coating 13 and the insulating external layer 20, and the contents of the flame retardant and the flame retardant auxiliary in these layers, but in the case where the contents of the flame retardant and the flame retardant auxiliary in the insulating coating 13 match those in the insulating external layer 20, even when the individual thicknesses of the insulating coating 13 and the insulating external layer 20 are slightly ununiform, the communication properties are not greatly affected as long as the total thickness of the insulating coating 13 and the insulating external layer 20 can be kept within a predetermined tolerance range, that is to say, the outer diameter of the overall communication cable 1 can be kept within a predetermined tolerance range. It is more preferable that the types and addition amounts of compounds added as additives other than the flame retardant and the flame retardant auxiliary in the insulating coating 13 match those in the insulating external layer 20. Note that the wording "the contents of the components in the insulating coating 13 are the same as those in the insulating external layer 20" encompasses not only the case where the contents thereof in the insulating coating 13 are entirely the same as those in the insulating external layer 20, but also the case where the contents thereof in the insulating coating 13 differ by about ±10% from those in the insulating external layer 20 (here, the contents are expressed in parts by mass with respect to 100 parts by mass of the polymer component in each of the insulating coating 13 and the insulating external layer 20).

(Wire Harness)

A wire harness according to an embodiment of the present disclosure includes the communication cable 1 according to the embodiment of the present disclosure described above. There is no particular limitation on the specific configuration of the wire harness as long as the wire harness includes one or more communication cables 1 according to the embodiment of the present disclosure. For example, the wire harness may include a communication cable in another form or a non-communication cable together with the communication cable 1 according to the embodiment of the present disclosure. Also, the communication cable 1 may be connected or coupled to another member such as a terminal connector as appropriate. The communication cable 1 according to the embodiment of the present disclosure is excellent in the stability of the communication properties, the heat resistance, and the productivity due to no coarse aggregates containing the flame retardant auxiliary being contained, and thus the overall wire harness also has these properties.

(Method for Manufacturing Communication Cable)

Next, a method for manufacturing a communication cable according to an embodiment of the present disclosure will be described. When the communication cable 1 is manufactured, constituent components of each of the insulating coating 13 for covering the outer circumference of the conductor 12 included in the signal wire 10 and the insulating external layer 20 for covering the outer circumference of the signal wire 10 are mixed to prepare a resin composition, and the resin composition is subjected to extrusion molding. At least one of the insulating coating 13 and the insulating external layer 20 is made of the above-mentioned predetermined flame-retardant resin composition formed by adding, to an olefin-based polymer, a flame retardant containing a brominated flame retardant and a flame retardant auxiliary containing antimony trioxide. In the manufacturing method according to this embodiment, when this flame-retardant resin composition is prepared, the flame retardant auxiliary masterbatch is formed using the flame retardant auxiliary in advance.

Specifically, the flame retardant auxiliary in the form of a powder is not directly mixed with other components as it is, but is mixed with a small amount of the polymer component to prepare a flame retardant auxiliary masterbatch in advance. In the flame retardant auxiliary masterbatch, the concentration of the flame retardant auxiliary in the polymer component is higher than that in the finally prepared flame-retardant resin composition. Then, the flame-retardant resin composition prepared in advance is mixed with other components, namely components other than the components contained in the flame-retardant resin composition out of the constituent components of the flame-retardant resin composition to be prepared, to prepare the flame-retardant resin composition. In the flame retardant auxiliary masterbatch, the aggregation diameter of the flame retardant auxiliary is 50 μm or less. The flame retardant is not added to the flame retardant auxiliary masterbatch. It is preferable that the flame retardant auxiliary masterbatch does not contain components other than the flame retardant auxiliary and the polymer component, in addition to the flame retardant.

A flame retardant auxiliary containing antimony trioxide is prone to secondary aggregation. Accordingly, if the flame retardant auxiliary in the form of a powder is mixed with other components to be included in the flame-retardant resin composition, aggregates tend to be formed due to insufficient mixing, and once aggregates are formed, it is difficult to return the aggregates to an unaggregated state. In particular, once the flame retardant auxiliary containing antimony trioxide enters a space between particles of the flame retardant such as a brominated flame retardant or a metal hydroxide flame retardant in the resin composition, coarse aggregates tend to be formed. Once aggregates containing the flame retardant auxiliary are formed in the resin composition, it is difficult to return the formed aggregates to an unaggregated state. However, if the flame retardant auxiliary is added to a small amount of the polymer component and mixed well to be dispersed in the polymer component in the form of fine particles that are less prone to secondary aggregation before being mixed with other components, particularly before being brought into contact with the flame retardant, the flame retardant auxiliary can be mixed with other components in a state in which secondary aggregation of the flame retardant auxiliary is suppressed, thus making it possible to obtain the flame-retardant resin composition.

In the case where the flame retardant auxiliary masterbatch is introduced to the flame-retardant resin composition, the formation of a coarse aggregate having an aggregation diameter greater than 50 μm is suppressed in the obtained flame-retardant resin composition, and as a result, spatial variation of the material properties such as dielectric properties, and a decrease in the heat resistance are reduced. The flame-retardant effect exhibited by the flame retardant auxiliary can also be improved by adding the finely dispersed flame retardant auxiliary to the resin composition, thus making it possible to reduce the amounts of the flame retardant and the flame retardant auxiliary added to the flame-retardant resin composition. In the process of forming the insulating coating 13 or the insulating external layer 20 through extrusion molding of the flame-retardant resin composition, the state of the resin composition and the manufacturing conditions are less likely to vary due to no coarse aggregates being formed, thus making it possible to improve the productivity of the communication cable 1. For example, when the communication cable 1 is continuously manufactured, the state of the flame-retardant resin composition can be stably maintained during the manufacturing period between the initial stage and the final stage, thus making it possible to manufacture the communication cable 1 having stable communication properties.

Although there is no particular limitation on the type of polymer component included in the flame retardant auxiliary masterbatch, it is preferable to use a polymer component that is similar to or the same as another polymer component included in the flame-retardant resin composition from the viewpoint of improving the mixability with the other polymer component. That is to say, it is preferable to use an olefin-based polymer. For example, it is sufficient that a portion of the polymer component to be contained in the finally prepared flame-retardant resin composition is used as the polymer component to be included in the flame retardant auxiliary masterbatch. In the flame retardant auxiliary masterbatch, a large amount of the flame retardant auxiliary is dispersed in a small amount of the polymer component, and therefore, it is preferable that the polymer component has high fluidity to some extent from the viewpoint of improving the dispersiveness of the flame retardant auxiliary. For example, it is preferable that a polymer component having a melt flow rate (MFR: measured with a load of 2.16 kg at 230° C.; the same measurement conditions apply hereinafter) of 5 g/10 minutes or more, or furthermore 10 g/10 minutes or more, is used for the masterbatch. Also, it is preferable that a polymer component to be used for the masterbatch has an MFR of approximately 50 g/10 minutes or less from the viewpoint of the mixability with another polymer component included in the flame-retardant resin composition.

The concentration of the flame retardant auxiliary in the flame retardant auxiliary masterbatch is preferably 50 mass % or more and more preferably 70 mass % or more with respect to the overall mass of the masterbatch. With this configuration, when the masterbatch is prepared through mixing, it is easy to concentrically apply a shear force to the high-concentration flame retardant auxiliary to recover an unaggregated state. Also, adding the masterbatch that contains the flame retardant auxiliary at a high concentration to another component makes it possible to improve the manufacturing efficiency of the flame-retardant resin composition. Meanwhile, it is preferable that the concentration of the flame retardant auxiliary in the flame retardant auxiliary masterbatch is 90 mass % or less. With this configuration, it is easy to sufficiently disperse the particles of the flame retardant auxiliary in the polymer component in the masterbatch.

The flame retardant auxiliary masterbatch preferably has an MFR of 1 g/10 minutes or more, and more preferably 3 g/10 minutes or more, as a whole. With this configuration, when mixed with other components, the masterbatch can be dispersed in another polymer component included in the flame-retardant resin composition without so intensive kneading, and a rise in the temperature caused by kneading is suppressed. Meanwhile, the MFR of the flame retardant auxiliary masterbatch is preferably controlled to 10 g/10 minutes or less, and more preferably 8 g/10 minutes or less. With this configuration, it is easy to avoid the case where shearing cannot be effectively performed due to a difference in viscosity between the flame retardant auxiliary masterbatch and the other polymer component included in the flame-retardant resin composition, leading to poor dispersion.

The insulated wire 11 can be formed by extruding, on the outer circumference of the conductor 12, the resin composition for the insulating coating 13 prepared as the predetermined flame-retardant resin composition or another type of resin composition. Then, the signal wire 10 is obtained as a parallel pair wire formed by arranging two of the thus-obtained insulated wires 11 side-by-side, or a twisted pair wire formed by twisting the two insulated wires 11 together. The communication cable 1 with the insulating external layer 20 can be manufactured by extruding, on the outer circumference of the signal wire 10, the resin composition for the insulating external layer 20 prepared as the predetermined flame-retardant resin composition or another type of resin composition. The insulating external layer 20 having a hollow structure or a solid structure can be selectively formed by controlling the conditions (e.g., the shape of a die point, the extrusion temperature, etc.) of the extrusion molding in the formation of the insulating external layer 20.

EXAMPLES

The following describes examples. Note that the present invention is not limited to these examples. In the description below, samples were produced and evaluated in the atmosphere at room temperature unless otherwise stated.

[1] State of Flame Retardant Auxiliary in Flame-Retardant Resin Composition

First, the states of a flame retardant auxiliary in a flame-retardant resin composition were compared between the case where the powder of the flame retardant auxiliary was introduced to the flame-retardant resin composition and the case where a flame retardant auxiliary masterbatch was formed and then introduced to the flame-retardant resin composition.

[Production of Samples]

First, three types of compositions A1 to A3 were prepared as the flame-retardant resin composition. The composition A1 was produced by adding a flame retardant auxiliary in the form of a powder to a polymer component and a brominated flame retardant and kneading the resultant mixture. The composition A2 was produced by kneading the composition A1 again. The composition A3 was produced by forming a flame retardant auxiliary masterbatch and then kneading this masterbatch with a polymer component and a flame retardant. The component compositions of the compositions A1 to A3 were as follows: 40 parts by mass of a brominated flame retardant and 20 parts by mass of a flame retardant auxiliary were contained in 100 parts by mass of polypropylene serving as a polymer component.

Each of the compositions A1 to A3 prepared above was extruded so as to cover the outer circumference of a twisted pair wire formed by twisting a pair of insulated wires together to form an insulating external layer having a solid structure. Thus, communication cables according to samples A1 to A3 were obtained. Note that neither a flame retardant nor a flame retardant auxiliary was contained in the insulating coating of the insulated wire included in the twisted pair wire.

[Evaluation Method]

Each of the communication cables of the samples A1 to A3 was cut in a direction perpendicular to the axial direction, and the cross section was observed using a microscope. The state of the distribution of the flame retardant auxiliary was examined in the observed image.

[Evaluation Results]

Figure 3A:
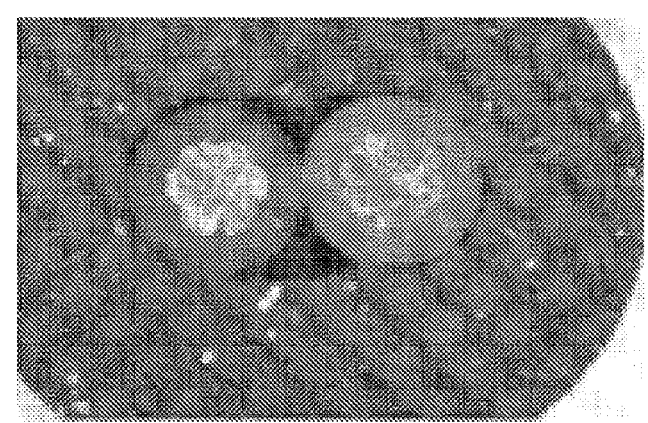
FIGS. 3A to 3C show micrographs of cross sections of communication cables in which a flame retardant auxiliary is added to an insulating external layer.
Figure 3B:
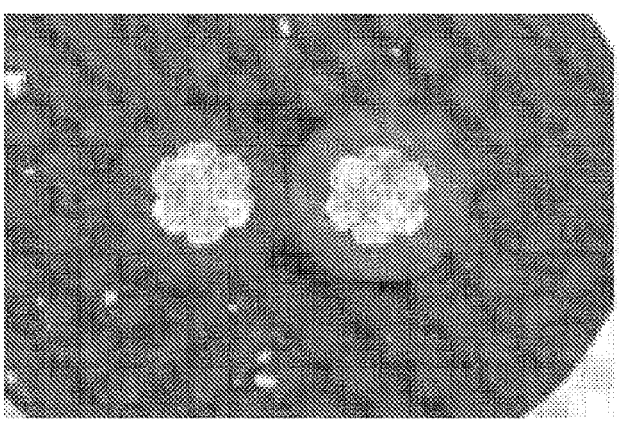
Figure 3C:
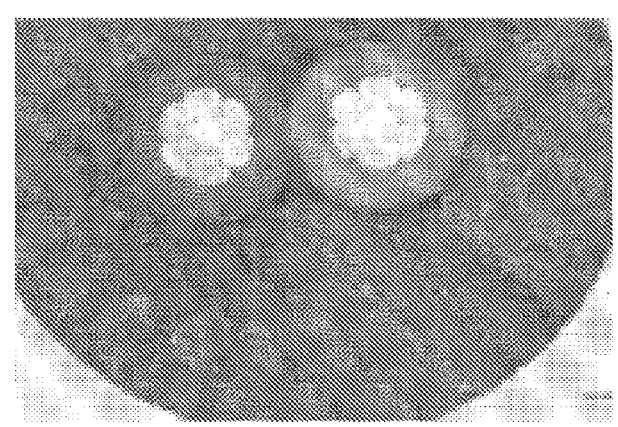

FIGS. 3A to 3C show the observed images of the cross sections of the samples A1 to A3, respectively. First, in the sample A1 shown in FIG. 3A in which the flame retardant auxiliary in the form of a powder was added, particles, which are observed as white spots, scattered in the composition of the insulating external layer, which is observed as a black face. These particles correspond to aggregates formed through secondary aggregation of the flame retardant auxiliary. The particle diameters of the aggregates were approximately 30 to 50 μm, and some large aggregates had a particle diameter greater than 50 μm. As described above, when the flame retardant auxiliary in the form of a powder is added to the flame-retardant resin composition, the flame retardant auxiliary forms coarse aggregates.

In the sample A2 shown in FIG. 3B in which the flame retardant auxiliary in the form of a powder was added and then kneading was performed twice as well, white particles corresponding to aggregates of the flame retardant auxiliary were observed as the sample A1 in FIG. 3A. Compared with the sample A1, the number of aggregates slightly decreased, whereas the sizes of the observed aggregates hardly changed. Thus, it can be said that, once the flame retardant auxiliary forms aggregates, it is difficult to return the aggregates to an unaggregated state and form fine particles even by additionally performing kneading.

Meanwhile, in the sample A3 shown in FIG. 3C in which the flame retardant auxiliary masterbatch was formed and then added, substantially no white particles corresponding to aggregates of the flame retardant auxiliary were visually observed in the composition of the insulating external layer, which is observed as a black face. When the image is closely observed, aggregates can be seen, but the particle diameters thereof are about 10 μm at most. It is found from these results that the flame retardant auxiliary is finely dispersed in the resin composition without the formation of coarse aggregates by forming the flame retardant auxiliary masterbatch and then mixing this masterbatch with other components. It is conceivable that the flame retardant auxiliary was returned to an unaggregated state through kneading performed during the preparation of the masterbatch, and the flame retardant auxiliary was kept in a finely dispersed state even after the masterbatch was added to the resin composition and was kneaded.

[2] Relationship Between State of Flame Retardant Auxiliary and Material Properties Next, a relationship between the state of the flame retardant auxiliary observed above and the material properties of the flame-retardant resin composition was investigated.

[Production of Samples]

First, three types of compositions B1 to B3 were prepared as the flame-retardant resin composition. The composition B1 was produced by adding a flame retardant auxiliary in the form of a powder to polypropylene serving as a polymer component and a brominated flame retardant and kneading the resultant mixture. The compositions B2 and B3 were produced by forming a flame retardant auxiliary masterbatch and then kneading this masterbatch with a polymer component and a flame retardant. Table 1 below shows the blend amounts (unit: part by mass) of the components of the compositions. The composition B2 and the composition B3 differ in the contents of the flame retardant and the flame retardant auxiliary. Note that the compositions B1 and B2 are the same as the compositions A1 and A3 in the test (1) above, respectively.

Each of the compositions B1 to B3 prepared above was extruded so as to cover the outer circumference of a twisted pair wire formed by twisting a pair of insulated wires together to form an insulating external layer having a solid structure with a thickness of 0.18 mm. Thus, communication cables according to samples B1 to B3 were obtained. Note that neither a flame retardant nor a flame retardant auxiliary was contained in the insulating coating of the insulated wire included in the twisted pair wire.

[Evaluation Method]

The communication cables of the samples B1 to B3 prepared above were subjected to a combustion test in conformity with ISO 6722. That is to say, each of the communication cables of the samples was cut into a piece with a length of 600 mm, and the cut piece was held at an inclination of 45°. Then, a gas burner was placed at a position 100 mm away from the lower side of the sample, and the sample was flamed for 15 seconds. The period of time between when the flame was moved away and when the fire went out was measured. The same measurement was performed on ten sample pieces that were independently produced from each of the samples B1 to B3.

[Evaluation Results]

Table 1 below shows the constitutions of the flame-retardant resin compositions included in the insulating external layers of the samples, and the combustion times measured in the combustion test performed on the ten pieces N1 to N10. Regarding the blend amount of the flame retardant auxiliary, the amount of the flame retardant auxiliary itself is provided even in the case where the masterbatch (MB) was used. The polymer component contained in the masterbatch is included in "Total amount of polymer components."

TABLE 1

| | | Sample B1 | Sample B2 | Sample B3 |
|---|---|---|---|---|
| Constitution of composition (part by mass) | Total amount of polymer components | 100 | 100 | 100 |
| | Brominated flame retardant | 40 | 40 | 35 |
| | Flame retardant auxiliary (powder) | 20 | — | — |
| | Flame retardant auxiliary (MB) | — | 20 | 15 |
| Combustion time (second) | N1 | 4.1 | 1.1 | 1.2 |
| | N2 | 3.1 | 1.2 | 1.1 |
| | N3 | 20.6 | 1.1 | 1.3 |
| | N4 | 2.9 | 1.2 | 0.8 |
| | N5 | 18.7 | 1.6 | 1.4 |
| | N6 | 21.5 | 1.1 | 1.1 |
| | N7 | 2.8 | 1.3 | 1.2 |
| | N8 | 2.0 | 0.9 | 1.6 |
| | N9 | 1.8 | 1.3 | 1.0 |
| | N10 | 77 | 1.1 | 1.4 |

Table 1 shows that, in the sample B1 in which the flame retardant auxiliary in the form of a powder was added, the combustion times of the sample pieces N3, N5, N6, and N10 exceeded 10 seconds. In particular, the combustion time of the sample piece N10 exceeded 70 seconds. In contrast, in the sample B2 in which the brominated flame retardant in the same amount as that in the sample B1 was added and the flame retardant auxiliary in the same amount as that in the sample B1 was added using the masterbatch, the combustion times of all the sample pieces were less than 1.6 seconds, and were shorter compared with all the sample pieces of the sample B1. Thus, it can be said that the resin composition of the sample B2 has higher flame retardancy. Furthermore, the combustion times of the ten pieces of the sample B1 distribute in a broad range of 1.8 seconds to 77 seconds, whereas the combustion times of the ten pieces of the sample B2 fall within a narrow range of 0.9 seconds to 1.6 seconds. That is to say, the flame retardancy of the sample B1 varied greatly, whereas stably high flame retardancy was achieved in the sample B2.

According to the results of the test [1] above, the flame retardant auxiliary forms coarse aggregates in the case where the flame retardant auxiliary in the form of a powder is added as in the sample B1. It is conceivable that, due to the formation of aggregates, the flame retardancy improving effect of the flame retardant auxiliary cannot be sufficiently exhibited, and the flame retardancy improving effect becomes spatially ununiform. It is construed that the result is that, compared with the sample B2, the sample B1 has lower flame retardancy, and the flame retardancy of the sample B1 varies more greatly. Meanwhile, according to the results of the test [1], the flame retardant auxiliary does not form coarse aggregates and is finely dispersed in the polymer component in the case where the flame retardant auxiliary masterbatch is formed and then added as in the sample B2. As a result, it is conceivable that, in the sample B2, the flame retardant auxiliary exhibits a high flame retardancy improving effect, and the spatial uniformity of the flame retardancy improving effect is high. Accordingly, it is construed that, in the sample B2, high flame retardancy is stably achieved regardless of the sample pieces.

In the sample B3, as in the sample B2, the flame retardant auxiliary masterbatch was formed and then added, but the addition amounts of the brominated flame retardant and the flame retardant auxiliary were smaller than those in the sample B2. Based on the comparison between the combustion test results of the sample B2 and the sample B3 shown in Table 1, the combustion times of these samples are substantially the same. The longest combustion times of these samples are both 1.6 seconds. Thus, it can be said that sufficiently high flame retardancy can be achieved by form- ing the flame retardant auxiliary masterbatch and then adding this masterbatch even in the case where the contents of the flame retardant and the flame retardant auxiliary are reduced as in sample B3. It is conceivable that this is because the flame retardant auxiliary is dispersed in the form of fine particles in the polymer component and can thus exhibit a high flame retardancy improving effect even in a small amount.

[3] Relationship Between Component Composition of Resin Composition and Various Properties of Communication Cable Next, by changing the component compositions of the resin compositions included in the insulating coating and the insulating external layer, a relationship between the proper- ties of the communication cable and the component com- position of the resin composition was investigated.

[Production of Samples]

(1) Production of Conductor

Electrolytic copper with a purity of 99.99% or more and a master alloy containing elemental Fe and elemental Ti were placed in a high-purity carbon crucible and melted under vacuum to produce a mixed molten metal. Here, the mixed molten metal contained Fe in an amount of 1.0 mass % and Ti in an amount of 0.4 mass %. Continuous casting was performed on the obtained mixed molten metal to manufacture a cast material with a diameter of 12.5 mm. The obtained cast material was subjected to extrusion and rolling until the diameter was reduced to 8 mm, and was then drawn until the diameter was reduced to 0.165 mm. Seven of the thus-obtained strands were used, were twisted together at a twisting pitch of 14 mm, and were subjected to compression molding. Then, heat treatment was performed at 500° C. for 8 hours. The obtained conductor had a cross-sectional area of 0.13 mm$^2$ and an outer diameter of 0.45 mm.

(2) Preparation of Flame Retardant Auxiliary Masterbatch

Sb-MBs 0 to 5 were prepared as flame retardant auxiliary masterbatches containing a flame retardant auxiliary made of antimony trioxide. A commercially available product below was used as Sb-MB 0. Sb-MBs 1 to 5 were each produced by blending a polyolefin resin below and antimony trioxide, mixing them at 200° C. using a twin-screw kneader (37-mm diameter), and granulating the mixture. In the following descriptions, the blend ratios of the components are represented in units of mass %.

Sb-MB 0: "C390" manufactured by Suzuhiro Chemical Co., Ltd. (polypropylene 10%, antimony trioxide 90%)

Sb-MB 1: Polypropylene resin ("NOVATEC BC03C" manufactured by Japan Polypropylene Corporation) 10%, antimony trioxide ("MSW" manufactured by Yamanaka & Co., Ltd.) 90%

Sb-MB 2: Polypropylene resin (ditto) 30%, antimony trioxide (ditto) 70%

Sb-MB 3: Polypropylene resin (ditto) 50%, antimony trioxide (ditto) 50%

Sb-MB 4: Polypropylene resin ("NOVATEC EC9GD" manufactured by Japan Polypropylene Corporation) 10%, antimony trioxide (ditto) 90%

Sb-MB 5: Polypropylene resin ("NOVATEC BC6C" manufactured by Japan Polypropylene Corporation) 10%, antimony trioxide (ditto) 90%

The masterbatches differed in the MFR from one another, and Tables 2 to 4 show their MFRs (230° C., 2.16 kg). Note that the MFRs were measured using a melt indexer manu- factured by Toyo Seiki Seisaku-sho, Ltd.

(3) Preparation of Resin Composition

Resin compositions for forming insulating coatings and insulating external layers of communication cables of samples C1 to C9 and D1 to D5 were prepared by blending components shown in Tables 2 to 4 and mixing them at 220° C. using a twin-screw extruder (37-mm diameter).

Materials used as the components are as follows.

Polypropylene Resin

PP1: "NOVATEC EC9" manufactured by Japan Polypro- pylene Corporation

PP2: "NOVATEC FY6H" manufactured by Japan Poly- propylene Corporation

PP3: "NOVATEC EA9" manufactured by Japan Polypro- pylene Corporation

PP4: "Adflex Q300F" manufactured by LyondellBasell Industries NV

Polyethylene Resin

PE: "INFUSE 9107" manufactured by Dow Chemical Company Resin having polar functional group Functional group-containing resin 1: "TUFTEC M1913" manufactured by Asahi Kasei Corporation, maleic anhydride modified SEBS Functional group-containing resin 2: "LOTADER 3430" manufactured by SK Functional Polymer, ethylene- methyl acrylate-maleic anhydride random copolymer (methyl acrylate 15 mass %, maleic anhydride 3 mass %)

Flame Retardant

Metal hydroxide: "KISUMA 5" manufactured by Kyowa Chemical Industry Co., Ltd., magnesium hydroxide Brominated flame retardant 1: "SAYTEX 8010" manu- factured by Albemarle Corporation, ethylene-1,2-bis (pentabromophenyl)

Brominated flame retardant 2: "SAYTEX BT93W" manu- factured by Albemarle Corporation, ethylene bis-tetra- bromophthalimide Flame Retardant Auxiliary Antimony trioxide (powder): "MSW" manufactured by Yamanaka & Co., Ltd.

Flame retardant auxiliary masterbatches Sb-MBs 0 to 5 above

Other Additives

Antioxidant 1: "Irganox 1010" manufactured by BASF, hindered phenol-based antioxidant Antioxidant 2: "Irganox 3114" manufactured by BASF, hindered phenol-based antioxidant Antioxidant 3: "Zinc Oxide JIS #1" manufactured by Hakusui Tech., zinc oxide Antioxidant 4: "ANTAGE MB" manufactured by Kawa- guchi Chemical Industry Co., Ltd., 2-mercaptobenz- imidazol Antioxidant 5: "Sachtolith HD-S" manufactured by Sachtleben, zinc sulfide Metal deactivator: "ADEKASTUB CDA-1" manufac- tured by ADEKA Corporation (4) Production of Communication Cable The resin composition for an insulating coating prepared above was extruded on the outer circumference of the conductor produced above to form an insulating coating, and thus an insulated wire was produced. Two of the obtained insulated wires were twisted together at a twisting pitch of 20 mm, and thus a twisted pair wire was produced. When the insulated wires were twisted together, each of the insulated wires was not twisted about the twisting axis. Then, the resin composition for an insulating external layer prepared above was extruded on the outer circumference of the twisted pair wire to form an insulating external layer, and thus a communication cable was obtained.

In the samples C1 to C7 and the samples D1 to D3 and D5, the insulating coating had a thickness of 0.18 mm. The insulating external layer had a hollow structure with a thickness of 0.4 mm. Meanwhile, in the samples C8 and C9 and the sample D4, the insulating coating had a thickness of 0.19 mm. The insulating external layer had a solid structure with a thickness of 0.8 mm (average).

[Evaluation Method]

The samples C1 to C9 and D1 to D5 produced above were evaluated as follows. The samples C1 to C9 were subjected to all the evaluations, whereas the samples D1 to D5 were subjected to only major evaluations.

(External Appearance of Cable)

The insulated wire and the insulating external layer of each sample was cut into a round slice with a thickness of 100 μm or less using a utility knife to produce a cross-sectional sample. The cross-sectional sample was observed using a microscope, and protrusions protruding from the surfaces of the insulated wire and the insulating external layer were checked. When the largest protrusion among the protrusions of the insulated wire and the insulating external layer had a size of 10 μm or less, the external appearance was evaluated as "A+", which means "Very Good." When this size was more than 10 μm and 20 μm or less, the external appearance was evaluated as "A", which means "Good". When this size was more than 20 μm, the external appearance was evaluated as "B", which means "Poor."

(Flame Retardancy)

The flame retardancy was evaluated by performing a combustion test in conformity with ISO 6722. That is to say, each of the communication cables of the samples was cut into a piece with a length of 600 mm, and the cut piece was held at an inclination of 45°. Then, a gas burner was placed at a position 100 mm away from the lower side of the sample, and the sample was flamed for 15 seconds. The period of time between when the flame was moved away and when the fire went out was measured. When the fire went out within 30 seconds, the flame retardancy was evaluated as "A+", which means "Very Good." When the fire went out within a range of more than 30 seconds to 70 seconds or less, the flame retardancy was evaluated as "A", which means "Good." When the fire did not go out within 70 seconds, the flame retardancy was evaluated as "B", which means "Poor."

(Stability of Characteristic Impedance)

The characteristic impedances of the communication cables of the samples were measured through the open/short method using an LCR meter. All the communication cables had a characteristic impedance within a range of 100±10Ω. In addition, the stability of the characteristic impedance was evaluated. Specifically, the characteristic impedances of ten samples that were independently produced were measured. When a variation of the measurement values was 1Ω or less, the stability of the characteristic impedance was evaluated as "A+", which means "Very Good." When a variation of the measurement values was more than 1Ω and 3Ω or less, the stability of the characteristic impedance was evaluated as "A", which means "Good." When a variation of the measurement values was more than 3Ω, the stability of the characteristic impedance was evaluated as "B", which means "Poor."

(Stability of Transparent Mode Conversion)

The transparent mode conversion properties (LCTL) of the communication cables of the samples were measured.

The measurement was performed on each individual communication cable at a frequency of 50 MHz using a network analyzer. The LCTL of ten samples that were independently produced were measured. When a variation of the measurement values was 3 dB or less, the stability of the LCTL was evaluated as "A+", which means "Very Good." When a variation of the measurement values was more than 3 dB and 5 dB or less, the stability of the LCTL was evaluated as "A", which means "Good." When a variation of the measurement values was more than 5 dB, the stability of the LCTL was evaluated as "B", which means "Poor."

(Transparent Mode Conversion: Bundled State)

In order to investigate an influence of a surrounding metal material, a sample mimicking a wire harness was prepared as follows. Seven communication cables of the same type were prepared, and a bundle was formed by arranging six of the communication cables on the outer circumference of one communication cable serving as a measurement target, and adhesive tape made of a polyolefin was wound around the outer circumference of the bundle in a half-lap manner. The transparent mode conversion of the one measurement target communication cable located at the center of the bundle of the measurement sample was measured in the same manner as in the above-described evaluation of the stability of the transparent mode conversion. When a difference between the measurement value obtained using this bundle and the measurement value obtained using the one measurement target communication cable independently was 5 dB or less, it was considered that an influence of the surrounding metal was very small, and the transparent mode conversion properties were evaluated as "A+", which means "Very Good." When the difference was more than 5 dB and 10 dB or less, it was considered that an influence of the surrounding metal was small, and the transparent mode conversion properties were evaluated as "A", which means "Good." When the difference was more than 10 dB, it was considered that an influence of the surrounding metal was large, and the transparent mode conversion properties were evaluated as "B", which means "Poor."

(Heat Resistance)

As an endurance test, the communication cables of the samples were left to stand at 85° C. for 3000 hours. Before and after the endurance test, the characteristic impedance was measured in the same manner as in the above-described evaluation of the characteristic impedance. When a difference between the characteristic impedances measured before and after the endurance test was 5Ω or less, the heat resistance was evaluated as "A", which means "Good". Meanwhile, when the difference was more than 5Ω, the heat resistance was evaluated as "B", which means "Poor." Furthermore, when the heat resistance was evaluated as "Good" (A), a new sample was left to stand in a harsher environment (105° C.) for 3000 hours as another endurance test. When a difference between the characteristic impedances measured before and after this endurance test was 5Ω or less, the heat resistance was evaluated as "A+", which means "Very Good."

(Abrasion Resistance)

The communication cables of the samples were subjected to an abrasion resistance test in conformity with ISO 6722. That is to say, an iron wire with an outer diameter of 0.45 mm was pressed against a communication cable with a load of 7 N and was then reciprocated at a rate of 55 times/minute, the number of times the iron wire was reciprocated until the iron wire and the conductor of the communication cable were electrically connected was measured. When the number of times the iron wire was reciprocated was 300 or more, the abrasion resistance was evaluated as "A+", which means "Very Good." When the number of times the iron wire was reciprocated was 100 or more and less than 300, the abrasion resistance was evaluated as "A", which means "Good." When the number of times the iron wire was reciprocated was less than 100, the abrasion resistance was evaluated as "B", which means "Poor."

(Dielectric Constant)

The resin compositions included in the insulating coatings and the insulating external layers of the samples were used to produce samples for a dielectric constant measurement. The samples had a rectangular column shape with a depth of 1.5 mm, a length of 1.5 mm, and a height of 50 mm. The dielectric constant at 1 GHz of each of the obtained samples was measured using a cavity resonator method. In both cases of the insulating coating and the insulating external layer, when the relative dielectric constant was 2.0 or more and less than 2.8, the dielectric constant was evaluated as "A+", which means "Very Good." When the relative dielectric constant was 2.8 or more and less than 3.2, the dielectric constant was evaluated as "A", which means "Good." Note that a resin composition having a relative dielectric constant of 3.2 or more is not suitable as a constituent material of the communication cable, and therefore, a component composition with which the relative dielectric constant is 3.2 or more was excluded at the time when the component composition of a resin composition was determined.

(Elastic Modulus)

The resin compositions included in the insulating coatings and the insulating external layers of the samples were molded into a sheet, and thus dumbbell-shaped measurement samples with a thickness of 4 mm were produced. The measurement samples were subjected to a three-point bending test performed at a rate of 1 mm/minute in conformity with JIS K 7171. Then, the flexural modulus at a strain of 0.25 to 0.5 was measured. In the case of the insulating coating, when the flexural modulus was 800 MPa or more and 2000 MPa or less, the elastic modulus was evaluated as "A", which means "Good." In the case of the insulating external layer, when the flexural modulus was 300 MPa or more and 700 MPa or less, the elastic modulus was evaluated as "A", which means "Good." When the flexural modulus was out of these ranges, a range within the measurement value fell was shown in Tables 2 to 4.

(Size of Aggregate)

Each of the samples were cut at three positions at intervals of 1 m using a utility knife so as to obtain a round cross section, and the insulating coating and the insulating external layer in each cross section were observed using a microscope ("VHX6000" manufactured by Keyence Corporation). Then, the size (the length of the longest straight line extending across an aggregate) of each white powdery aggregate (see FIGS. 3A and 3B) was measured. The size of the largest aggregate among aggregates observed in the insulating coatings and the insulating external layers in the three cross sections was recorded.

[Evaluation Results]

The component compositions (unit: part by mass) of the insulating coating ("Coating layer" in the table) and the insulating external layer ("External layer" in the table) of each sample and the evaluation results from each sample are shown in Tables 2, 3, and 4 (Table 2: samples C1 to C5, Table 3: samples C6 to C9, Table 4: samples D1 to D5). Regarding the flame retardant auxiliary masterbatches (Sb-MBs 0 to 5), the content of the flame retardant auxiliary (antimony trioxide) is shown inside the parentheses, and the MFR measurement value is also shown. Although the flame retardant auxiliary masterbatches differed from one another in the ratio between the content of the flame retardant auxiliary and the content of the polymer component, the blend amounts of the components of each sample are shown such that the polymer component contained in the overall composition, which also includes the polymer component contained in the flame retardant auxiliary masterbatch, is taken as 100 parts by mass.

TABLE 2

| | | MFR (g/10 min) @230° C. | Sample No. | | | | | | | | | |
|---|---|---|---|---|---|---|---|---|---|---|---|---|
| | | | C1 | | C2 | | C3 | | C4 | | C5 | |
| | | | Coating layer | External layer | Coating layer | External layer | Coating layer | External layer | Coating layer | External layer | Coating layer | External layer |
| Component composition | PP1 | | 90 | | 45 | | | | 80 | | 40 | |
| | PP2 | | | | 45 | | | | | | 50 | 70 |
| | PP3 | | | | | | 90 | | | | | |
| | PP4 | | | 98.8 | | 98.8 | | 85.5 | | | | |
| | PE | | | | | | | | | 80 | | |
| | Functional group-containing resin 1 | | 8.9 | | 8.7 | | 5.5 | 10 | | | 8 | 28 |
| | Functional group-containing resin 2 | | | | | | | | 7.5 | 7.5 | | |
| | Metal hydroxide | | 30 | | 30 | | | 30 | | | 20 | 20 |
| | Brominated flame retardant 1 | | 20 | 25 | 20 | 25 | 30 | 30 | | | 20 | 20 |
| | Brominated flame retardant 2 | | | | | | | | 40 | 30 | | |
| | Antimony trioxide | | | | | | | | | | | |
| | Sb-MB0 (90%) | <1 | 11 | 12 | | | | | | | | |
| | Sb-MB1 (90%) | 3.5 | | | 13 | 12 | | | | | | |
| | Sb-MB2 (70%) | 7 | | | | | 15 | 15 | | | | |
| | Sb-MB3 (50%) | 12 | | | | | | | 25 | 25 | | |
| | Sb-MB4 (90%) | <1 | | | | | | | | | 20 | 20 |
| | Sb-MB5 (70%) | 15 | | | | | | | | | | |
| | Antioxidant 1 | | 2 | 2 | 2 | 2 | 3 | 3 | | | 3 | 3 |
| | Antioxidant 2 | | | | | | | | 2 | 2 | | |
| | Antioxidant 3 | | 5 | 5 | 5 | 5 | 3 | 3 | | | | |
| | Antioxidant 4 | | 5 | 5 | 5 | 5 | 3 | 3 | | | | |

TABLE 2-continued

| | MFR (g/10 min) @230° C. | C1 Coating layer | C1 External layer | C2 Coating layer | C2 External layer | C3 Coating layer | C3 External layer | C4 Coating layer | C4 External layer | C5 Coating layer | C5 External layer |
|---|---|---|---|---|---|---|---|---|---|---|---|
| Antioxidant 5 | | | | | | | | 10 | 10 | | |
| Metal deactivator | | 0.5 | 0.5 | 0.5 | 0.5 | 0.5 | 0.5 | 0.5 | 0.5 | 3 | 3 |
| Structure of insulating external layer | | Hollow | | Hollow | | Hollow | | Hollow | | Hollow | |
| Evaluation results — External appearance of cable | | A | | A+ | | A+ | | A | | A | |
| Flame retardancy | | A | | A+ | | A+ | | A | | A+ | |
| Stability of characteristic impedance | | A | | A+ | | A+ | | A | | A+ | |
| Stability of transparent mode conversion | | A | | A+ | | A+ | | A | | A+ | |
| Transparent mode conversion (bundled state) | | A | | A | | A | | A | | A | |
| Heat resistance | | A+ | | A+ | | A | | A+ | | A | |
| Abrasion resistance | | A | | A | | A | | A | | A+ | |
| Dielectric constant | | A | A+ | A | A+ | A+ | A | A+ | A+ | A | A |
| Elastic modulus (MPa) | | A | A | A | A | A | A | A | <300 | A | >700 |
| Size of aggregate (μm) | | 40 | | 20 | | 20 | | 40 | | 40 | |

TABLE 3

| | | MFR (g/10 min) @230° C. | C6 Coating layer | C6 External layer | C7 Coating layer | C7 External layer | C8 Coating layer | C8 External layer | C9 Coating layer | C9 External layer |
|---|---|---|---|---|---|---|---|---|---|---|
| Component composition | PP1 | | 90 | | 99 | | 100 | | 50 | |
| | PP2 | | | | | | | | 50 | 48.5 |
| | PP3 | | | | | | | | | |
| | PP4 | | | 90 | | 99 | | 80 | | 48.5 |
| | PE | | | | | | | | | |
| | Functional group-containing resin 1 | | 5.5 | 5.5 | | | | 18 | | |
| | Functional group-containing resin 2 | | | | | | | | | |
| | Metal hydroxide | | | | 90 | | | | | 50 |
| | Brominated flame retardant 1 | | 30 | 30 | 20 | 30 | | 40 | | 50 |
| | Brominated flame retardant 2 | | | | | | | | | |
| | Antimony trioxide | | | | | | | | | |
| | Sb-MB0 (90%) | <1 | | | | | | | | |
| | Sb-MB1 (90%) | 3.5 | | | 10 | 10 | | 20 | | |
| | Sb-MB2 (70%) | 7 | | | | | | | | |
| | Sb-MB3 (50%) | 12 | | | | | | | | |
| | Sb-MB4 (90%) | <1 | | | | | | | | 30 |
| | Sb-MB5 (70%) | 15 | 15 | 15 | | | | | | |
| | Antioxidant 1 | | 3 | 3 | 3 | 3 | 3 | 3 | 3 | 3 |
| | Antioxidant 2 | | | | | | | | | |
| | Antioxidant 3 | | 1.5 | 1.5 | 1.5 | 1.5 | 3 | 3 | | |
| | Antioxidant 4 | | 1.5 | 1.5 | 1.5 | 1.5 | 3 | 3 | | |
| | Antioxidant 5 | | | | | | | | 5 | 5 |
| | Metal deactivator | | 0.5 | 0.5 | 0.5 | 0.5 | 0.5 | 0.5 | 3 | 3 |
| | Structure of insulating external layer | | Hollow | | Hollow | | Solid | | Solid | |
| Evaluation results | External appearance of cable | | A | | A+ | | A+ | | A | |
| | Flame retardancy | | A | | A | | A | | A | |
| | Stability of characteristic impedance | | A | | A+ | | A+ | | A | |
| | Stability of transparent mode conversion | | A | | A+ | | A+ | | A | |
| | Transparent mode conversion (bundled state) | | A | | A | | A+ | | A+ | |
| | Heat resistance | | A+ | | A+ | | A+ | | A+ | |
| | Abrasion resistance | | A | | A | | A | | A | |
| | Dielectric constant | | A | A+ | A | A+ | A+ | A+ | A+ | A |
| | Elastic modulus (MPa) | | A | A | >2000 | A | <800 | A | <800 | A |
| | Size of aggregate (μm) | | 40 | | 20 | | 30 | | 50 | |

TABLE 4

| | | MFR (g/10 min) @230° C. | Sample No. | | | | | | | | | |
|---|---|---|---|---|---|---|---|---|---|---|---|---|
| | | | D1 | | D2 | | D3 | | D4 | | D5 | |
| | | | Coating layer | External layer | Coating layer | External layer | Coating layer | External layer | Coating layer | External layer | Coating layer | External layer |
| Component composition | PP1 | | 90 | | 45 | | 100 | | 50 | | 45 | |
| | PP2 | | | | 45 | | | | 50 | 45.5 | 45 | |
| | PP3 | | | | | | | | | | | |
| | PP4 | | | 100 | | 100 | | 80 | | 45.5 | | 100 |
| | PE | | | | | | | | | | | |
| | Functional group-containing resin 1 | | 10 | | 10 | | | 20 | | | 10 | |
| | Functional group-containing resin 2 | | | | | | | | | | | |
| | Metal hydroxide | | 30 | | 30 | | | | | | 200 | 200 |
| | Brominated flame retardant 1 | | 20 | 30 | 20 | 30 | | | | | | |
| | Brominated flame retardant 2 | | | | | | | | | | | |
| | Antimony trioxide | | 10 | 10 | 10 | 15 | | | | | | |
| | Sb-MB0 (90%) | <1 | | | | | | | | | | |
| | Sb-MB1 (90%) | 3.5 | | | | | | | | | | |
| | Sb-MB2 (70%) | 7 | | | | | | | | 30 | | |
| | Sb-MB3 (50%) | 12 | | | | | | | | | | |
| | Sb-MB4 (90%) | <1 | | | | | | | | | | |
| | Sb-MB5 (70%) | 15 | | | | | | | | | | |
| | Antioxidant 1 | | 2 | 2 | 2 | 2 | 3 | 3 | 3 | 3 | 2 | |
| | Antioxidant 2 | | | | | | | | | | | |
| | Antioxidant 3 | | 5 | 5 | 5 | 5 | 3 | 3 | | | | |
| | Antioxidant 4 | | 5 | 5 | 5 | 5 | 3 | 3 | | | | |
| | Antioxidant 5 | | | | | | | | 5 | 5 | 3 | |
| | Metal deactivator | | 0.5 | 0.5 | 0.5 | 0.5 | 0.5 | 0.5 | 3 | 3 | 0.5 | 0.5 |
| | Structure of insulating external layer | | Hollow | | Hollow | | Hollow | | Solid | | Hollow | |
| Evaluation results | External appearance of cable | | B | | B | | A | | A | | A | |
| | Flame retardancy | | A | | A | | B | | B | | A | |
| | Stability of characteristic impedance | | B | | B | | A | | A | | A | |
| | Stability of transparent mode conversion | | B | | B | | A | | A | | A | |
| | Heat resistance | | A+ | | A+ | | A | | A | | B | |
| | Size of aggregate (µm) | | 80 | | 100 | | None | | <10 | | None | |

In the insulating coatings and/or the insulating external layer of all the samples C1 to C9, antimony trioxide serving as the flame retardant auxiliary used together with the flame retardant was not added to the resin composition in the form of a powder, but a masterbatch containing antimony trioxide at a high concentration was produced in advance and was then added to the resin composition. In response to this, the aggregate size was 50 µm or less in all of the samples. The cables had a favorable external appearance due to the flame retardant auxiliary being finely dispersed in the resin composition as described above. The flame retardancy was also improved. Furthermore, the stability of the characteristic impedance and the stability of the transparent mode conversion were improved, which suggests that the material properties of the resin composition are highly uniform due to the flame retardant auxiliary being finely dispersed. The heat resistance was also improved, and thus it can be said that the material properties of the resin composition are stably maintained after the resin composition is exposed to a high-temperature environment.

Meanwhile, in the samples D1 and D2, antimony trioxide serving as the flame retardant auxiliary was added in the form of a powder without using a masterbatch. In response to this, the aggregate size was 80 µm or more, indicating that the flame retardant auxiliary formed coarse aggregates. In response to the formation of coarse aggregates, the cables of these samples had a poor external appearance. Also, the stability of the characteristic impedance and the stability of the transparent mode conversion decreased, and it is conceivable that spatial ununiformity of the properties of the resin composition increased due to the formation of coarse aggregates.

In the sample D3, the flame retardant and the flame retardant auxiliary were not added to neither the insulating coating nor the insulating external layer, and thus the flame retardancy decreased. In the sample D4, the flame retardant auxiliary was added to the insulating coating, but the flame retardant was not added to neither the insulating coating nor the insulating external layer. The flame retardancy of this sample also decreased. That is to say, the flame retardant auxiliary does not exhibit sufficient flame retardancy unless it is used together with the flame retardant. In the sample D5, only the metal hydroxide was added as the flame retardant to the insulating coating and the insulating external layer. This sample D5 had high flame retardancy but low heat resistance. A metal hydroxide has a lower flame-retardant effect than a brominated flame retardant, and therefore, the addition amount of the metal hydroxide was as high as 200 parts by mass with respect to the 100 parts by mass of the polymer component in order to obtain sufficient flame retardancy. It is thus conceivable that the heat resistance of the resin composition decreased due to a large amount of inorganic particles being contained.

Lastly, the evaluation results of the samples C1 to C9 will be compared with one another. The flame retardant auxiliary masterbatches used in the samples C2, C3, C7, and C8 had an MFR within a range of 1 to 10 g/10 minutes. In these samples, the aggregate size was as small as 30 µm or less, and the cable had an excellent external appearance, and highly stable characteristic impedance and transparent mode conversion, which were all evaluated as "A+." It is conceivable that, due to the MFR of the flame retardant auxiliary masterbatch being within the range above, the flame retardant auxiliary tends to be highly dispersed in the resin composition, resulting in a minute aggregation diameter, a favorable external appearance of the cable, and high stability of the material properties.

Regarding the insulating coatings and the insulating external layers of the samples C1 to C9, some contained the metal hydroxide together with the brominated flame retardant, and others did not contain the metal hydroxide flame retardant. When the dielectric constants were compared, the samples without a metal hydroxide flame retardant generally had a lower dielectric constant, which was evaluated as "A+." Although a metal hydroxide is an inexpensive flame retardant, it can be said that an aspect in which only a brominated flame retardant is used as the flame retardant and a flame retardant auxiliary containing antimony trioxide is used together is preferable from the viewpoint of keeping the dielectric constant of the resin composition low.

In the samples C1 to C7, the insulating external layer had a hollow structure, and both the insulating coating and the insulating external layer contained the flame retardant containing a brominated flame retardant, and the flame retardant auxiliary. Meanwhile, in the samples C8 and C9, the insulating external layer had a solid structure, and only the insulating external layer contained the flame retardant and the flame retardant auxiliary. When the evaluation results of the transparent mode conversion in the bundled state were compared between these samples, the samples C8 and C9 with the insulating external layer having a solid structure had especially excellent transparent mode conversion properties (A+), and their mode conversion properties were less likely to be affected by surrounding metal. Due to the insulating external layer having a solid structure, it is possible to secure sufficiently high flame retardancy with only the insulating external layer, and thus there is no need to add the flame retardant or the flame retardant auxiliary to the insulating coating. It is construed that, due to neither the flame retardant nor the flame retardant auxiliary being added to the insulating coating, the dielectric constant of the insulating coating is reduced, the electromagnetic bonding between the conductor and surrounding metal can be easily weakened, and the mode conversion properties are improved.

Although the embodiments of the present disclosure have been described in detail, the present invention is not limited to the embodiments above, and various modifications can be made without departing from the gist of the present invention.

LIST OF REFERENCE NUMERALS

1 Communication cable
10 Signal wire
11 Insulated wire
12 Conductor
13 Insulating coating
20 Insulating external layer
What is claimed is:
1. A communication cable comprising:
a signal wire constituted by a pair of insulated wires each having a conductor and an insulating coating covering an outer circumference of the conductor; and
an insulating external layer covering an outer circumference of the signal wire, wherein a characteristic impedance is within a range of 100±10Ω,
at least one of the insulating coating and the insulating external layer is made of a flame-retardant resin composition that contains:
a polymer component containing at least one selected from a polyolefin and an olefin-based copolymer, the polymer component further containing a polar functional group comprising at least one selected from the group consisting of: a carboxylic acid group, an acid anhydride group, an epoxy group, a hydroxyl group, an amino group, a silane group, an acrylic group, and a methacrylic group;
a flame retardant containing a brominated flame retardant; and
a flame retardant auxiliary containing antimony trioxide,
an aggregate containing the flame retardant auxiliary has an aggregation diameter of 50 μm or less,
when a content of the polymer component is taken as 100 parts by mass, the flame-retardant resin composition contains:
the polar functional group in an amount of 0.05 parts by mass or more and 15 parts by mass or less,
the brominated flame retardant in an amount of 20 parts by mass or more and 50 parts by mass or less, and
the flame retardant auxiliary in an amount of 5 parts by mass or more and 25 parts by mass or less.
2. The communication cable according to claim 1,
wherein at least the insulating external layer is made of the flame-retardant resin composition.
3. The communication cable according to claim 1,
wherein the signal wire is a twisted pair wire formed by twisting the pair of insulated wires together.
4. The communication cable according to claim 1,
wherein a noise shielding member made of a metal is not provided between the insulating external layer and the signal wire.
5. The communication cable according to claim 1,
wherein the flame retardant contained in the flame-retardant resin composition is composed of
only the brominated flame retardant, or
a metal hydroxide flame retardant in addition to the brominated flame retardant.
6. The communication cable according to claim 1,
wherein at least the insulating external layer is made of the flame-retardant resin composition, and
in the flame-retardant resin composition included in the insulating external layer, when the content of the polymer component is taken as 100 parts by mass, a total content of the flame retardant and the flame retardant auxiliary is 30 parts by mass or more.
7. The communication cable according to claim 1,
wherein, when the content of the polymer component is taken as 100 parts by mass, the flame-retardant resin composition further contains a metal hydroxide flame retardant in an amount of 20 parts by mass or more and 100 parts by mass or less as the flame retardant in addition to the brominated flame retardant.
8. The communication cable according to claim 1,
wherein the insulating coating is made of a resin composition containing at least one selected from a polyolefin and an olefin-based copolymer and neither the flame retardant nor the flame retardant auxiliary, and
the insulating external layer is made of the flame-retardant resin composition.

9. The communication cable according to claim 8, wherein the insulating external layer has a solid structure.

10. The communication cable according to claim 1, wherein both the insulating coating and the insulating external layer are made of the flame-retardant resin composition.

11. The communication cable according to claim 10, wherein the insulating external layer has a hollow structure.

12. The communication cable according to claim 10, wherein contents of the flame retardant and the flame retardant auxiliary in the flame-retardant resin composition included in the insulating coating are the same as those in flame-retardant resin composition included in the insulating external layer, based on a mass of a polymer component.

13. The communication cable according to claim 10, wherein the insulating coating further contains a metal deactivator and an antioxidant, and the insulating external layer further contains an antioxidant.

14. The communication cable according to claim 1, wherein the insulating external layer is made of the flame-retardant resin composition, and 100 parts by mass of the polymer component included in the insulating external layer contains 5 parts by mass or more and 20 parts by mass or less of at least one polymer having a polyolefin, an olefin-based copolymer, or a styrene-based rubber as a main chain and a polar functional group that is not incorporated in the main chain.

15. A wire harness comprising a communication cable according to claim 1.

16. The communication cable according to claim 10, wherein contents of the flame retardant and the flame retardant auxiliary in the insulating coating are lower than contents of the flame retardant and the flame retardant auxiliary in the insulating external layer, such that the insulating coating has a lower relative dielectric constant than a relative dielectric constant of the insulating external layer, a constituent material of the insulating coating has a relative dielectric constant of 1.9 or more and less than 2.9, and a constituent material of the insulating external layer has a relative dielectric constant of 2.3 or more and less than 3.2.

17. The communication cable according to claim 10, wherein the insulating coating comprises at least one of homopolypropylene and ethylene-propylene block copolymers in which an ethylene component amount is less than a propylene component amount, the insulating external layer comprises a copolymer containing polypropylene and a rubber component including at least one of ethylene-propylene rubber, polyethylene rubber, and diene rubber, the insulating coating has a higher flexural modulus than a flexural modulus of the insulating external layer, a constituent material of the insulating coating has a flexural modulus of 800 MPa or more and 2000 MPa or less, and a constituent material of the insulating external layer has a flexural modulus of 300 MPa or more and 700 MPa or less.

* * * * *